United States Patent
Baba et al.

(10) Patent No.: US 6,945,279 B2
(45) Date of Patent: Sep. 20, 2005

(54) THIN-WALLED RUBBER HOSE AND METHOD OF PRODUCING THE SAME

(75) Inventors: Hiroki Baba, Saitama (JP); Yuji Hirano, Saitama (JP); Hiromi Fujii, Saitama (JP); Takafumi Matano, Saitama (JP)

(73) Assignee: Yamashita Rubber Kabushiki Kaisha, Saitama (JP)

( * ) Notice: Subject to any disclaimer, the term of this patent is extended or adjusted under 35 U.S.C. 154(b) by 296 days.

(21) Appl. No.: 10/148,416

(22) PCT Filed: Jun. 15, 2001

(86) PCT No.: PCT/JP01/05129

§ 371 (c)(1),
(2), (4) Date: Jun. 24, 2002

(87) PCT Pub. No.: WO02/29299

PCT Pub. Date: Apr. 11, 2002

(65) Prior Publication Data

US 2003/0131899 A1 Jul. 17, 2003

(30) Foreign Application Priority Data

Sep. 29, 2000 (JP) .................................... 2000-301531
Sep. 29, 2000 (JP) .................................... 2000-301532
Sep. 29, 2000 (JP) .................................... 2000-301533

(51) Int. Cl.[7] .............................................. F16L 11/08
(52) U.S. Cl. ...................... 138/137; 138/126; 138/127; 138/143; 138/DIG. 10
(58) Field of Search .............................. 138/137, 140, 138/141, 126, 127, 143, DIG. 7, DIG. 10

(56) References Cited

U.S. PATENT DOCUMENTS

| | | | | |
|---|---|---|---|---|
| 5,839,478 A | * | 11/1998 | Colcombet et al. | ......... 138/141 |
| 6,213,155 B1 | * | 4/2001 | Furuta et al. | ............... 138/123 |
| 6,213,156 B1 | * | 4/2001 | Niki et al. | .................. 138/126 |
| 6,237,641 B1 | * | 5/2001 | Niki et al. | .................. 138/126 |
| 6,345,647 B2 | * | 2/2002 | Niki et al. | .................. 138/126 |
| 6,390,140 B2 | * | 5/2002 | Niki et al. | .................. 138/127 |
| 6,439,268 B2 | * | 8/2002 | Niki et al. | .................. 138/126 |
| 6,688,339 B2 | * | 2/2004 | Yamaguchi et al. | ........ 138/129 |
| 2004/0040609 A1 | * | 3/2004 | Oishi et al. | .................. 138/141 |

FOREIGN PATENT DOCUMENTS

| | | |
|---|---|---|
| JP | 2-179213 A | 7/1990 |
| JP | 7-314610 A | 12/1995 |
| JP | 9-169061 A | 6/1997 |

\* cited by examiner

*Primary Examiner*—Patrick Brinson
(74) *Attorney, Agent, or Firm*—Birch, Stewart, Kolasch & Birch, LLP

(57) ABSTRACT

An impermeable rubber hose is thinned for the purpose of reducing weight and costs. A rigid resin film is used as an intermediate layer. When the resin film is gradually rolled up into a cylindrical shape from a planar shape and fed to an extrusion head and rubber is simultaneously extrusion-molded inside and outside the cylindrical film, the film produces a break or a twist to make extrusion molding difficult. It is an object of the present invention to make simultaneous extrusion molding possible even in such a condition.

To attain the above object, a thermoplastic resin film (5) which forms an intermediate layer (2) and of which the melting point is lower than the vulcanizing temperature is formed in a long belt-shape. Slits (7) are provided at fixed intervals on the right and left long side sections (8, 8) of the film (5) in the longitudinal direction. When the resin film (5) is fed into an extrusion head (10) to be rolled up into a cylindrical shape, because both the long side sections (8, 8) of the film (5) are formed as weak sections by the slits (7), the film (5) adsorbs a strain when bent and is bent in a circle, thereby allowing the right and left long side sections (8, 8) to overlap at an overlapping section (6). In this condition, rubber is simultaneously extrusion-molded inside and outside the film and then, vulcanized to weld the overlapping section (6), thereby eliminating the slits (7).

15 Claims, 26 Drawing Sheets

Longitudinal direction

Fig. 19
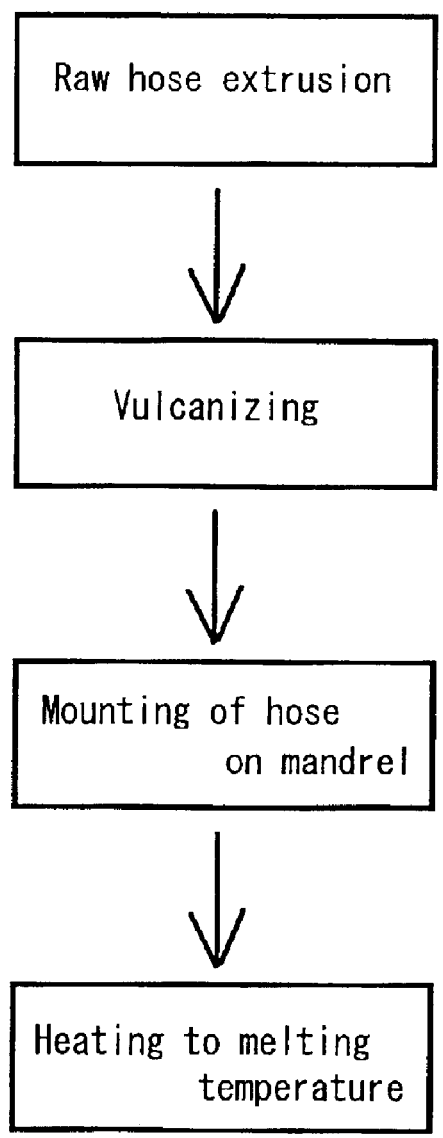
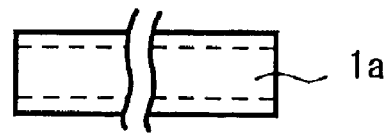
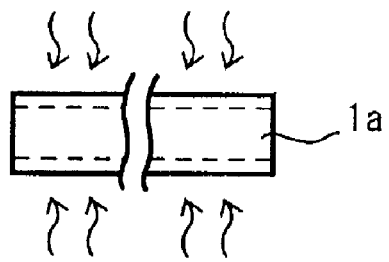
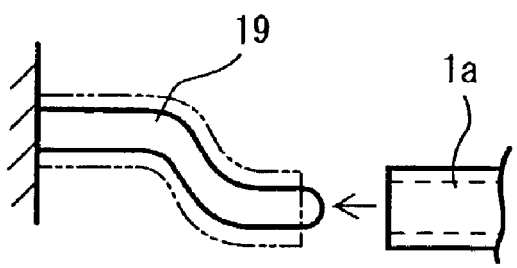
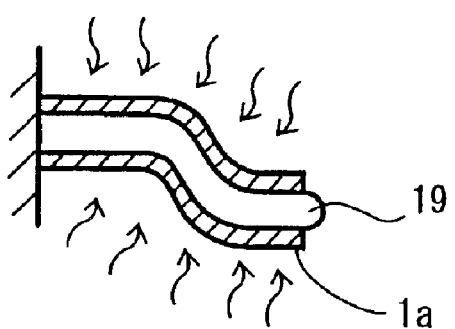

Fig. 26
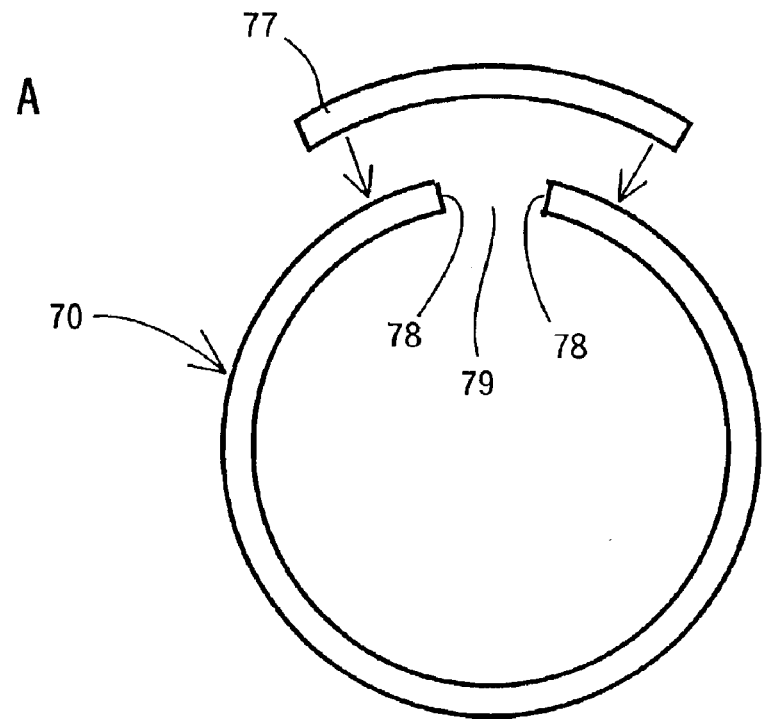
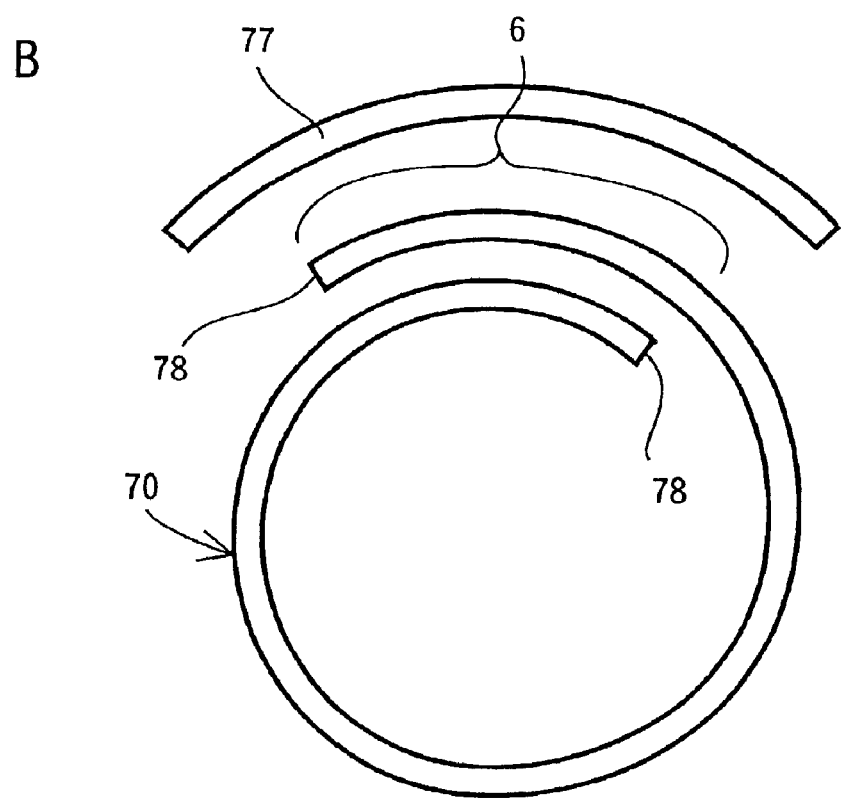

THIN-WALLED RUBBER HOSE AND METHOD OF PRODUCING THE SAME

This application is the national phase under 35 U.S.C. § 371 of PCT International Application No. PCT/JP01/05129 which has an International filing date of Jun. 15, 2001, which designated the United States of America.

FIELD OF THE INVENTION

The present invention relates to a method for producing a liquid or gas transportation hose, and more particularly to a method for extrusion-molding rubber inside and outside an intermediate layer which is formed by rolling up a film made of a resin or the like into a cylindrical shape to allow both ends in the bending direction to overlap.

DESCRIPTION OF THE PRIOR ART

An example of a rubber hose wherein rubber and a resin film are laminated is disclosed in Japanese Unexamined Patent Publication No. SHO 60-113882 in which an inner layer rubber, the resin film serving as an intermediate layer, and an outer layer rubber are extrusion-molded one by one. Also, in Japanese Unexamined Patent Publication No. HEI 7-314610, there is a description of a fluororesin film having excellent permeability resistance being used alone as the intermediate layer and this resin film is simultaneously extrusion-molded together with the inner and outer rubber layers. For such simultaneous extrusion molding, a method for feeding a long, belt-shaped resin film into an extrusion head for rolling up into a cylindrical shape and for extruding rubber inside and outside the resin film is also known.

Further, Japanese Unexamined Patent Publication No. HEI 9-169061 discloses that in such a simultaneous extrusion molding, reinforced fibers such as long belt-shaped knit are rounded into a cylindrical shape to provide an intermediate layer, and inner and outer rubber layers are simultaneously extrusion-molded, while feeding the intermediate layer into an extrusion head.

When a liquid or gas transportation hose is thinned for the purpose of reducing weight and costs, an inner layer collapses in a process for weaving a reinforced intermediate layer and a process for coating a subsequent outer layer rubber according to a hose production method of conventional specifications and molding becomes very difficult. Even in simultaneous extrusion molding in which weaving of the reinforced intermediate layer is not necessary, when the thickness of an overlapping section of the reinforced intermediate layer is reduced, the strength deteriorates and the thickness is limited to about 3.5 mm.

In the extrusion molding method, when the rubber hose is produced using a resin and a metal film in the intermediate layer for the purpose of thinning and improvement of permeability, an intermediate layer film is inserted into an extrusion head in a planar ribbon shape, i.e. a long belt shape. As a result, a strain is generated in the intermediate layer film in a process in which the film is finally wound from a conical shape to a cylindrical shape. Accordingly, if the intermediate layer film is made of a material which is soft and not flexible, a break or a twist is produced in the intermediate film layer and the method becomes limited, inasmuch as the film cannot be extrusion-molded into a uniformly cylindrical shape.

It is therefore a first object of the present invention to solve the above-mentioned problems, to increase the degrees of freedom for bending during molding, to provide an impermeable thin rubber hose which is thin and has excellent pressure resistance, and to realize an efficient production method of the rubber hose.

When a film made of resin etc. is rolled into a cylindrical shape and fed into an extrusion head, allowing both ends in the bending direction to overlap, wherein rubber is simultaneously extruded inside and outside the film, an overlapping section of the film is provided and if this overlapping section is vulcanized while opening, there is the possibility that liquid or gas contained within can permeate outside through this opening to the detriment of the permeability resistance. To avoid this, the degree of adhesion at the overlapping section must be increased so as not to generate openings at each step to the completion of the vulcanization. Causes of deterioration of the degree of adhesion by emergence of openings at the overlapping section include:

1) By using a high elastic modulus film with high rigidity, softened inner and outer rubber layers directly after extrusion are deformed to open by restoration of elasticity;
2) Displacement of the overlapping section by bending of a raw rubber hose when mounted on a mandrel for vulcanizing; and
3) Generation of a gap in the overlapping section by welding the overlapping section of which adhesion is incomplete.

The above-mentioned problem is readily caused when the film is too hard to bend. When the bending load (hereinafter simply referred to as "film bending load) of the film in measurements converted from bending modulus of the film material in the cross-section of which the width is 100 mm and the thickness is 0.05 mm is 400 N or more, it was difficult so far to perform extrusion-molding in a condition in which the film is rolled to allow the end sections to overlap. It was also difficult to perform subsequent operations such as mounting of the hose on the mandrel.

Accordingly, if a thin film with superb flexibility is adopted, this kind of opening possibility can be eliminated. However, it is difficult to satisfy the permeability resistance and a tear in the film is readily generated when used during molding or under high pressure. Accordingly, a film thickness of at least 0.05 mm or more is generally necessary to satisfy the demands of permeability resistance and pressure resistance.

However, when the film of such a thickness is a thermoplastic resin, because the resin strongly exhibits the properties of elasticity and rigidity as an inherent property, it is difficult to roll the film into a cylindrical shape so that it serves as an intermediate layer. Even though the rolled intermediate layer is formed, the strength of the outer layer rubber is less than the elasticity of the film at the stage of raw rubber hose before vulcanizing, the overlapping section easily opens due to the elasticity of the film. When the raw rubber hose is mounted on the mandrel for vulcanizing, the overlapping section readily opens because the stress also acts from the inner surface of the hose. This phenomenon also applies to an inorganic film such as metal. Accordingly, it is extremely difficult to mold vulcanized rubber hose by rolling up the film, which has a fixed thickness and a fixed hardness necessary to satisfy the permeability resistance and pressure resistance performance, to form an overlapping section, thereby performing simultaneous extrusion-molding.

Further, when the film is extrusion-molded in a condition in which volatile foreign material such as water is adhering to the surface of the film, the volatile content expands during a heating process such as vulcanizing. As a result, a foaming phenomenon is generated when the rubber and the film adhere or the overlapping section of the film is welded.

Accordingly, there is some possibility that the product performance will deteriorate. It is therefore an second object of the present invention to solve the problems described above and to provide a film which can be rolled up to form an overlapping section, wherein the film serving as an intermediate layer can be simultaneously extrusion-molded.

And it is a third object of the present invention to make simultaneous extrusion molding possible using an intermediate layer made of a high elastic material.

In the case where the long belt-shaped resin film is rounded in a cylindrical shape, an overlapping section is formed at a part of the circumferential section in the longitudinal direction. As a result, a bar-shaped step resulting from the overlapping section is formed on the surface of a rubber hose. Accordingly, when the rubber hose is mounted on the other member and secured by a spring clip, the fastening force becomes inconstant and as a result, an improved method of securing is required to improve the sealing properties or non-ejection properties. Particularly, if a rubber hose is thinned for the purpose of lightening and miniaturization, this bar-shaped step becomes larger. Also, if the resin film is thickened to improve the barrier properties for permeation of gas or liquid, the step becomes larger. It is therefore a fourth object of the present invention to provide an improved thin rubber hose in which, even though an overlapping section is formed on an intermediate layer, this does not affect the surface of the rubber hose.

DISCLOSURE OF THE INVENTION

To attain the above first object, according to the present application, a rubber hose having a resin film as an intermediate layer with an inner rubber layer and an outer rubber layer laminated inside and outside the resin film is provided, characterized in that the resin film is composed of a long, belt-shaped film, wherein a weak section is provided in advance on the long sides of the film and the resin film is rolled up into a cylindrical shape so that the two long sides overlap. In this case, the resin film can be a laminated metal film or reinforced fiber layer structure.

According to the present invention, a method of producing a thin rubber hose by extrusion molding comprises the steps of feeding a long, belt-shaped resin film which is provided with a weak section on the long sides in advance, to be rolled up and bent into a cylindrical shape so that the two long sides overlap, extruding rubber inside and outside the resin film for integration and extrude-molding a raw rubber hose of which the intermediate layer is the resin film, and heating the raw rubber hose up to a predetermined temperature for vulcanization.

In this case, the resin film is a thermoplastic resin, wherein the overlapping section can be vulcanized, and simultaneously, integrally welded. Further, the weak section can be formed by providing a plurality of slits or a plurality of punched holes, or by thinning one or both of the long side sections which overlap. It is also possible to provide this thinned section in a tapered shape.

The rubber is mixed with a thermoplastic resin, wherein after vulcanizing the raw rubber hose, this hose can be reheated to the melting temperature of the mixed thermoplastic resin so that a predetermined shape can be provided. As methods for extrusion molding the inner and outer rubber layers, there are a construction method for simultaneously extruding the inner layer rubber and the outer layer rubber inside and outside the resin film, and a construction method for extruding a laminated inner layer rubber film first and then extruding the outer layer rubber on the laminated inner layer rubber film. Either method can be adopted.

According to a thin rubber hose and its production method according to the present invention, when a resin film is rolled up in a cylindrical shape within an extrusion head or the like, because a weak section is provided in advance on the long sides, a strain in the resin film generated in the rolling-up process is adsorbed by deformation of the weak section. Because even a rigid resin film can be easily bent in the cylindrical shape, simultaneous extrusion molding is possible in a uniform shape. In addition, the degrees of freedom for bending at the time of vulcanizing molding can be increased. Further, sections other than an overlapping section of the film also closely contact the inner and outer layer rubbers by reduced pressure adsorption and this close contact can be maintained until completion of a vulcanizing process whereby the shape is finally determined. Accordingly, production of a thin hose that has been difficult until now is also possible. Further, it is possible to efficiently produce an impermeable rubber hose that is thin and has excellent pressure resistance.

To attain the above second and third objects, a method for producing a thin rubber hose which has an intermediate film layer according to the present invention is provided, in which an inner layer rubber and an outer layer rubber are extruded inside and outside the intermediate layer made of film of a substantially cylindrical shape to mold the rubber hose, the method comprising the steps of rolling the belt-shaped film into a cylindrical shape to allow a pair of edge sections, one on each side in the lateral direction, to overlap so that an overlapping section is formed, feeding the film into an extrusion head, and extruding the inner layer rubber and the outer layer rubber inside and outside the film while decompressing and drawing the overlapping section into the extrusion head.

In this case, there are two methods for feeding the film into the extrusion head: First, the film is rolled from a planar shape to a substantially cylindrical shape at the inlet of the extrusion head to be fed into the extrusion head (hereinafter referred to as "bending treatment within the extrusion head"). The second is that the film is shaped into a substantially cylindrical shape in advance in front of the inlet of the extrusion head and is then fed into the extrusion head (hereinafter referred to as "bending treatment outside the extrusion head"). Further, a construction technique for simultaneously extruding the inner layer rubber and the outer layer rubber inside and outside the film, and a construction technique for extruding the laminated layer of the inner layer rubber and the film, and then extruding the outer layer rubber onto the film can also be adopted.

The film can be composed of a thermoplastic resin or an inorganic material such as a metal, or a laminated structure combining them. The bending load of the film of which the width is 100 mm and the thickness is 0.05 mm can be 400 N or more.

The two edge sections overlapping at the overlapping section can be tapered so that they are thinned toward the ends in the lateral direction.

In extrusion molding, the overlapping section can be caused to adhere by decompressing the overlapping section of the film that was rolled up into a circular shape. In the extruding molding for forming the overlapping section on the film, adhesion can be maintained so as to not allow the overlapping section to open within the extrusion head. Accordingly, even such an intermediate layer material that opens unless decompressed, simultaneous extrusion molding is possible. Since adhesion of the overlapping section can be continued until vulcanizing is completed after extrusion molding, adhesion of the overlapping section can be continued even within a raw rubber hose that is soft at an unvulcanized stage. Even when the raw rubber hose is mounted on the mandrel while being bent, it is possible to cause the overlapping section to not open while maintaining adhesion. It is also possible to prevent generation of a gap at the overlapping section by welding the overlapping section in an adhering condition.

Accordingly, even though the film bending load is 400 N or more for the film of which the width is 100 mm and the thickness is 0.05 mm, which is difficult in a conventional technique, it is possible to continue operations without any problems from extrusion molding to subsequent vulcanizing process by decompressing the overlapping section. In addition, since parts other than the overlapping section adhere to the inner and outer layer rubber by pressure reduction and adsorption, and this adhesion can be maintained until completion of the vulcanizing process whereby the shape is finally determined, it is possible to produce a thin hose that has been difficult until now.

Accordingly, it is possible to realize a method with excellent mass productivity, even though a film with a thickness that can satisfy the demands of reinforcement of heat; resistance and pressure resistance, and improvement of reinforcement and permeability resistance can be provided. Particularly, a film of a high elastic modulus that has been impossible to mold in a conventional technique can be used. Further, since both the resin and inorganic material can be used as the film material, it is possible to freely choose the material according to the purpose and performance required.

In this case, if the planar shaped film is processed by bending treatment within the extrusion head, it is possible to make the extrusion molding more efficient. Further, if the film is formed into a cylindrical shape in advance by bending treatment outside the extrusion head, processing becomes easier than with the bending treatment within the extrusion head and a film with higher rigidity can be used.

If each of a pair of edge sections overlapping at the overlapping section is tapered so that they are thinned toward each end, steps can be eliminated or reduced. Accordingly, when the rubber hose is mounted on the other member and secured using a spring clip, compacting (fastening) force becomes constant and as a result, positive fastening can be realized to improve the sealing properties and non-ejection properties. Even though the edge sections are thinly tapered, adhesion can be maintained by decompression.

To attain the above-mentioned third object, a method for producing a thin rubber hose provided with an intermediate layer according to the present invention is provided, in which an inner rubber layer and an outer rubber layer are extruded inside and outside the intermediate layer of a substantially cylindrical shape within an extrusion head, comprises the steps of forming a pipe serving as the intermediate layer in advance, providing the pipe with a cut line in the axial direction, feeding the pipe into the extrusion head while cutting the pipe open, and rounding the pipe again within the extrusion head to allow the cut line sections (i.e. end sections facing the cut line) to directly or indirectly overlap, thereby forming the cylindrical intermediate layer.

In this case, the intermediate layer can be composed of a thermoplastic resin, an inorganic material such as a metal, or a laminated structure combining these. Further, a bending load of the intermediate layer can be 400 N or more for a film of which a width is 100 mm and a thickness of 0.05 mm. The inner rubber layer and the outer rubber layer can also be extruded decompressing and drawing the overlapping section. There are two extruding methods: One is a construction technique for simultaneously extruding the inner rubber layer and the outer rubber layer inside and outside the pipe, and the other is a construction technique whereby the inner rubber layer and the pipe are first laminated and extruded, then the outer rubber layer is extruded onto the pipe. Either technique can be adopted. Further, the intermediate layer can be formed in a bellows-shape, be helically wound, or be provided with an embossment.

According to the present invention, a pipe serving as an intermediate layer is formed in advance. This pipe is provided with a cut line in the axial direction and fed into an extrusion head, cutting the pipe open. The pipe is rounded again within the extrusion head to allow the cut line section to directly or indirectly overlap, thereby forming the intermediate layer of a cylindrical shape. Thus, even a highly elastic material of which the bending load in a width of 100 mm and a thickness of 0.05 mm which is difficult in a conventional technique is 400 N or more can be rounded into a cylindrical shape and fed into the extrusion head. Accordingly, a method can be realized which has excellent productivity and which can use the intermediate layer of which the thickness can satisfy the demands of reinforcement, such as for pressure resistance and improvement of permeability resistance. Further, since either of the thermoplastic resin and the inorganic material or the laminated body of these can be used for the intermediate layer material, it is possible to freely choose any of them according to the aiming performance.

If the overlapping section is decompressed at the time of extrusion molding, it is possible to allow the overlapping section to adhere. Accordingly, adherence can be maintained so that the overlapping section does not open within the extrusion head, and simultaneous extrusion molding becomes possible without opening the overlapping section even in the case of high elastic material. Further, adherence of the overlapping section within the raw rubber hose can be maintained even at the unvulcanizing stage after extrusion molding. Even when the rubber hose is bent to be mounted on the mandrel in the subsequent vulcanizing process, it is possible to allow the overlapping section to continuously adhere so as not to open the overlapping section. Accordingly, by decompressing the overlapping section, operations from extrusion molding to completion of the subsequent vulcanizing process can be performed without any problem using the intermediate layer of high elasticity. Sections other than the overlapping section of the pipe are caused to adhere to the inner and outer rubber layers by decompression and drawing and this adherence is maintained until the completion of the vulcanizing process whereby a final shape is determined. Thus, it is also possible to produce a thin hose that would be difficult by a conventional technique. If the intermediate layer is provided with a bellows shape or is helically wound, or is provided with embossment, bending during mounting of the hose on the mandrel is easy and it is possible to make opening of the overlapping section more difficult.

To attain the above-mentioned fourth object, according to the present invention, a thin rubber hose comprising an inner rubber layer and an outer rubber layer laminated respectively inside and outside a resin film serving as an intermediate layer, characterized in that the intermediate layer has a circular cross-section and forms an overlapping section by allowing a pair of sides which divide the intermediate layer in the circumferential direction to overlap, wherein at least one of the two sides forming the overlapping section on the surface side is thinned to eliminate a step in the overlapping section on the outside. In this case, the thinned section can be tapered to reduce the thickness of the side toward one end in the circumferential direction.

Further, a method for producing a thin rubber hose by extrusion molding comprises the steps of thinning at least one of two long side sections of a long belt-shaped resin film, rounding the resin film to be fed into an extrusion head so that the two long sides of the resin film overlap to form an overlapping section where no step is produced at least on the surface side of the two sides, bending the resin film in a cylindrical shape within the extrusion head, and extruding rubber inside and outside the resin film.

It is also possible to round a long belt-shapes resin film to allow the two long side sections to overlap, form a cylindrical shape which has an overlapping section where a step is produced at least on the surface side of the two sides, eliminate the step on the surface side by a subsequent process, and extrude rubber inside and outside the cylindrical resin film.

According to the present invention, when the resin film is rounded in a cylindrical shape or after the resin film is rounded, it is possible to produce no step at least on the surface of the overlapping section. Accordingly, when a rubber layer is laminated inside and outside the cylindrically shaped resin film to produce a thin rubber hose, no step is produced resulting from the overlapping section on the thin rubber hose surface.

Accordingly, when the thin rubber hose is mounted on the other member and secured by a spring clip, the fastening force becomes constant to improve the sealing properties, wherein it is possible to make it difficult for the rubber hose to become detached from the other member.

BRIEF DESCRIPTIONS OF THE DRAWINGS

FIG. 19 is a view showing a vulcanizing process according to a eighth embodiment;

FIG. 26 is a view showing a joint structure of an overlapping section according to an eleventh embodiment;

DESCRIPTION OF THE PREFERRED EMBODIMENT

Figure 1:
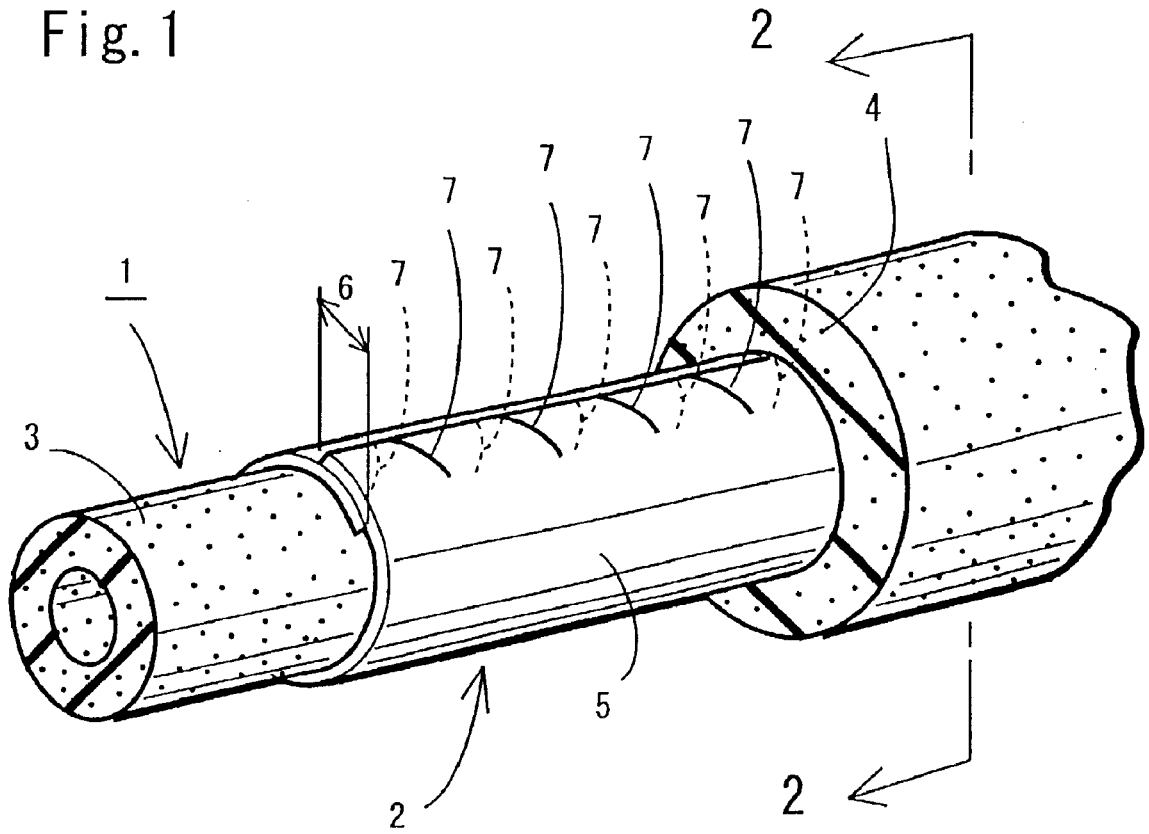
FIG. 1 is a perspective view of a hose product partially cut away according to a first embodiment (FIGS. 1 through 6)
Figure 2:
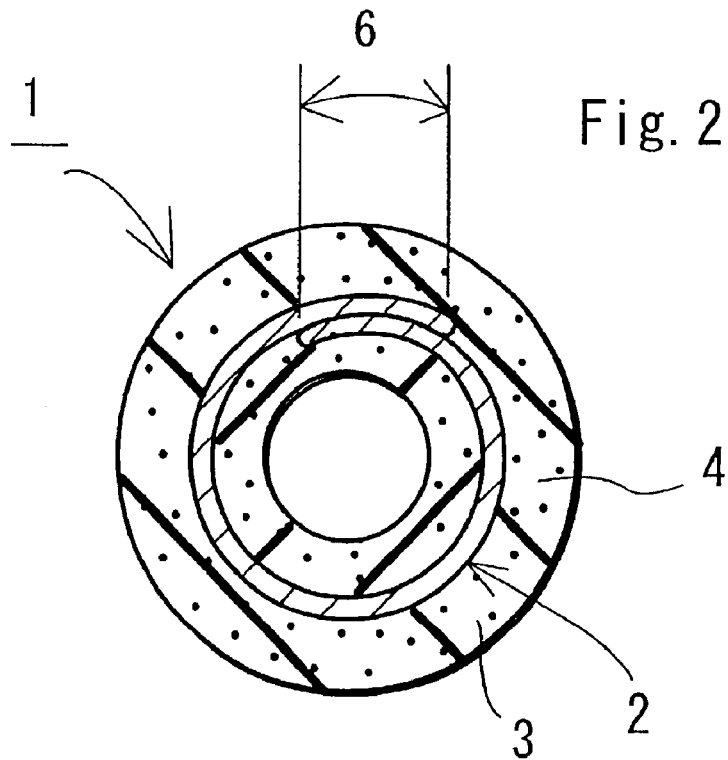
FIG. 2 is a cross-sectional view taken along line 2—2 of FIG. 1.

Preferred embodiments of the present invention will now be described with reference to the accompanying drawings. As shown in FIGS. 1 and 2, a rubber hose 1 according to the present invention is provided with an inner rubber layer 3 inside an intermediate layer 2 made of a resin film and an outer rubber layer 4 outside the intermediate layer 2. The rubber hose 1 is obtained by extrusion-molding these three layers at the same time.

The total thickness of the rubber hose 1 including the intermediate layer 2, the inner layer rubber layer 3, and the outer layer rubber layer 4 is about 1.5~3.5 mm. This is a remarkably thin hose compared with a conventional one. In the present invention, a thin hose means one in such a thickness range. It is desirable that the total thickness of the intermediate layer 2 be in a range between 0.01 mm and 1.00 mm.

The resin film 5 forming the intermediate layer 2 is rolled up into a cylindrical form to provide a partially overlapping section 6. The overlapping section 6 is provided in the longitudinal direction with a plurality of slits 7 at predetermined intervals.

The resin film 5 forming the intermediate layer 2 is a thermoplastic resin of which the melting point is between 50° C. and 300° C. For example, THV500 and THV610G (trade names of ternary fluororesin manufactured by Sumitomo 3M Co., Ltd.) or nylon-12 are used. A material for such a resin film can be chosen from a resin such as LDPE (low density polyethylene), LLDPE (linear low density polyethylene), HDPE (high density polyethylene), PP (polypropylene), PET (polyethylene terephthalate), PBT (polybutylene terephthalate), PA6 (polyamide 6), PA66 (polyamide 66), PA11 (polyamide 11), PA12 (polyamide 12), PPS (polyphenylene sulfide), PVDC (polyvinylidene chloride), PVC (polyvinyl chloride), PVA (polyvinyl alcohol), ethylene-vinyl alcohol copolymer, or fluororesin (monopolymer, bipolyiner, and terpolymer) according to use in view of strength, pressure resistance, permeability resistance, melting point, heat resistance, flexibility resistance, price or the like. A film can be manufactured by either of an inflation film molding method or a T-die molding method, so that multi-layer extrusion is possible for each molding method. Further, it is possible to laminate separately extruded films for molding at a later process.

A rubber material forming the inner rubber layer 3 and the outer rubber layer 4 can be chosen from NBR (nytril butadiene rubber), SBR (styrene butadiene rubber), FKM (fluorine-contained rubber), BR (butadiene rubber), CR (chloroprene rubber), IIR (isobutylene isoprene rubber), CSM (chlorosulfonated polyethylene rubber), ECO (epichlorohydrine rubber), EPDM (ethylene-propylene-diene rubber), or silicon rubber based on demand characteristics from the viewpoints of permeability resistance, strength, heat resistance, weather resistance, chemical resistance, oil resistance, cold resistance, hardness, specific gravity, or price. The inner and outer layers can be manufactured as a structure of up to three layers by combining the same or separate materials.

Figure 3:
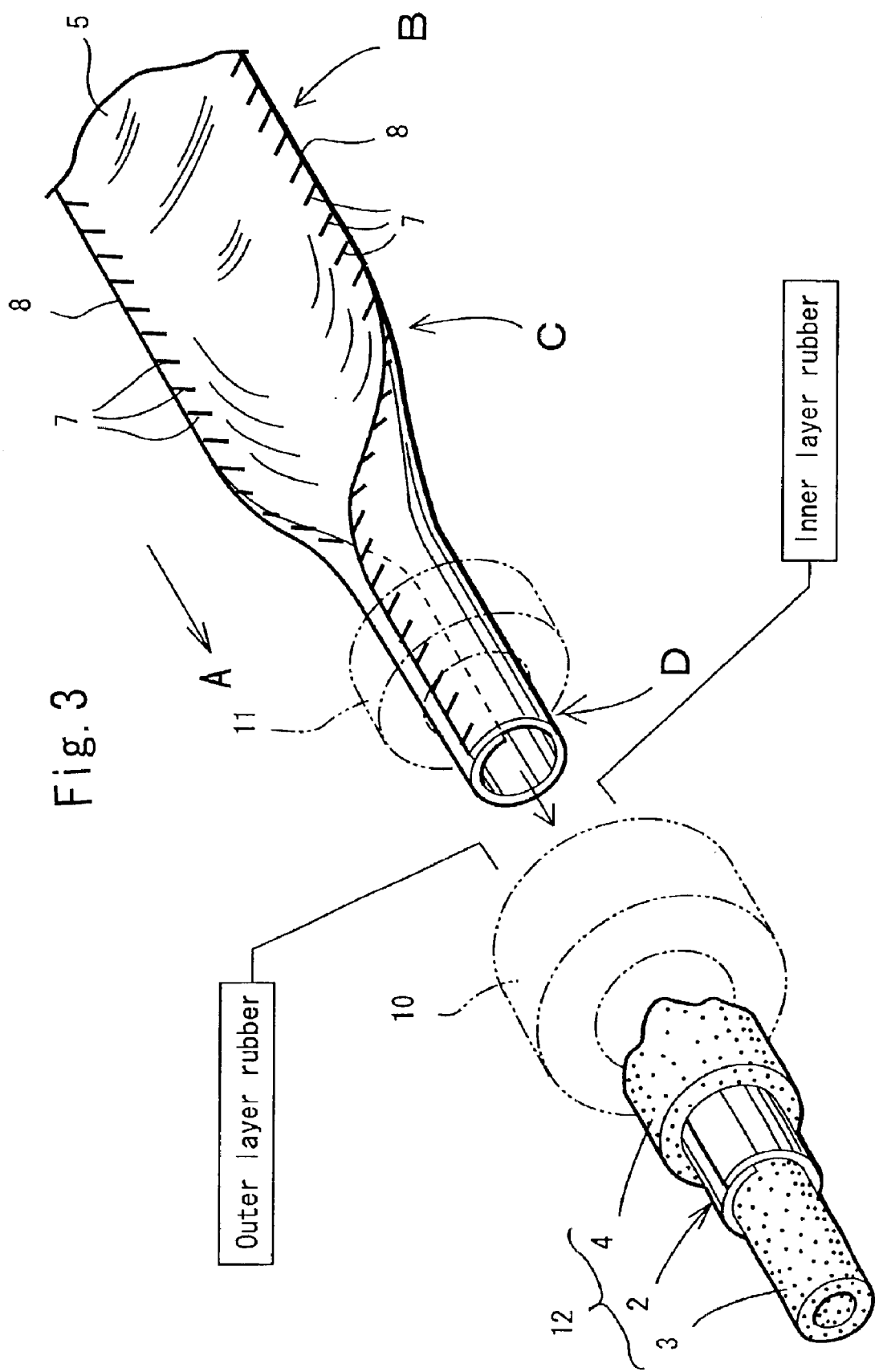
FIG. 3 is a view schematically showing an extrusion molding process.

FIG. 3 is a view for schematically explaining simultaneous extrusion molding in which an intermediate layer forming section 11 of an extrusion head 10 is separately shown for the sake of convenience. In this figure, a resin film 5 formed in a long, belt-shape is continuously fed into the intermediate layer forming section 11 along a feeding direction A. In this case, the resin film 5 gradually changes its shape from the original planar shape B to a conical shape C and then a cylindrical shape D when fed into the intermediate layer forming section 11.

Namely, the right and left, long side sections 8, 8 relative to the feeding direction A are overlapped within the intermediate layer forming section 11 to form an overlapping section 6. The right and left long side sections 8, 8 are rolled up in a circular section to form a cylindrical shape D, but first they form a conically shaped section C as an intermediate form for shifting from the planar shape B to the cylindrical shape D in the vicinity of the inlet of the intermediate layer forming section 11. At the conically shaped section C, both the long side sections 8, 8 of the resin film 5 are bent in the direction in which they come close to gradually form the overlapping section 6.

When the resin film 5 forms the cylindrical shape D within the intermediate layer forming section 11, an inner layer rubber and an outer layer rubber are extruded inside and outside the cylindrical shape D by the extrusion head 10, wherein a hollow raw rubber hose 12 obtained by integrally forming these three layers is simultaneously extrusion-molded and exits the extrusion head 11. This raw rubber hose 12 is cut to a predetermined dimension and becomes a completed rubber hose product 1 through a vulcanizing process described later.

Figure 4:
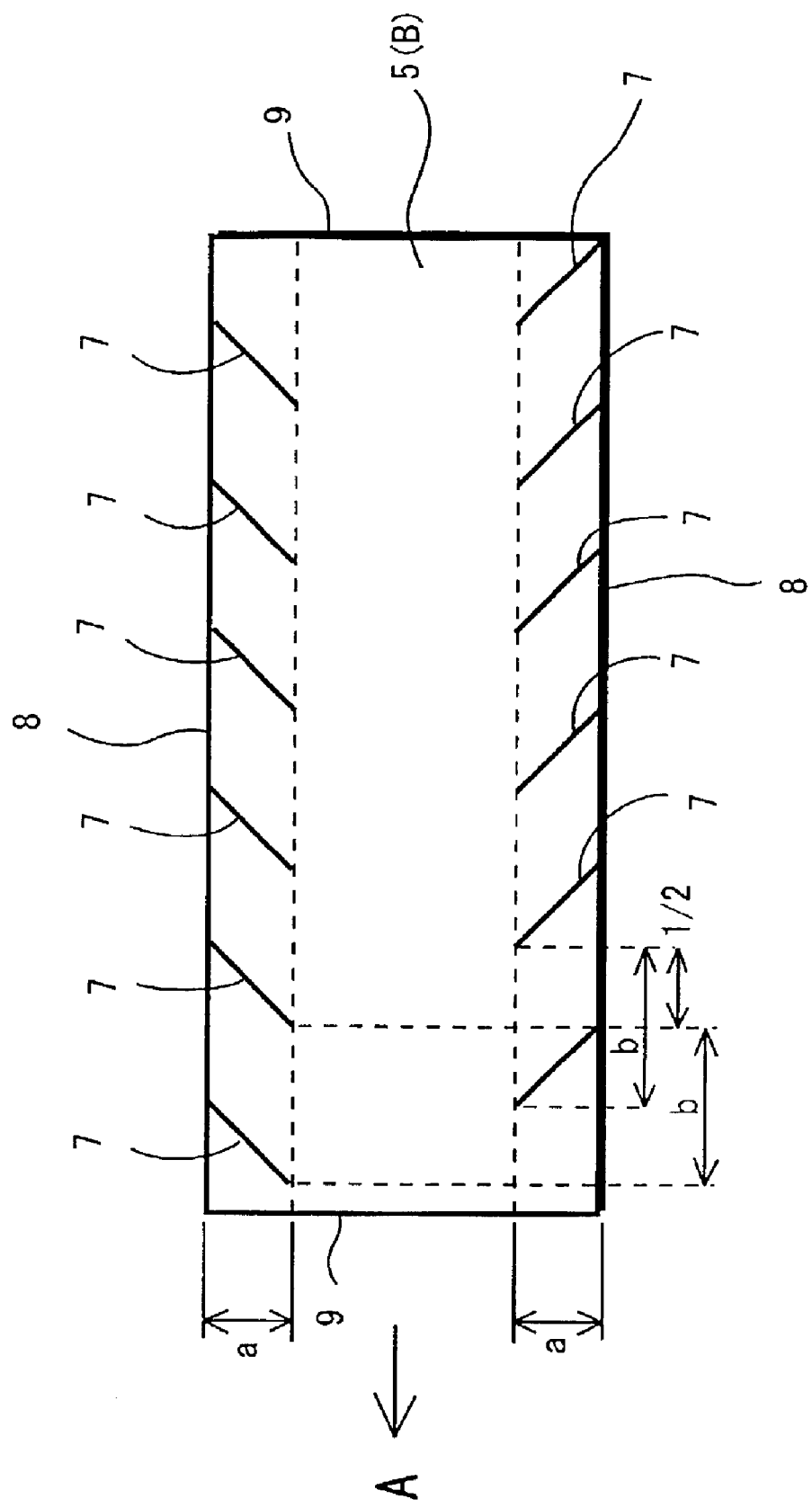
FIG. 4 is a view showing a planar shape of a resin film.

FIG. 4 shows part of the resin film 5 which is in the planar shape B. Slits 7 are provided by cutting the edge section of the right and left, long side sections 8, 8 in a range, entering inwardly, forming a width of an overlapping dimension (a) from each edge section of both long side sections on the right and left side. This overlapping dimension (a) has a width equivalent to or smaller than that of the overlapping section 6. The structure of the long sided sections 8, 8 forming the slits 7 is one specific example of a weak section structure.

The slits 7 are formed in such a manner that the inward end section is inclined forward toward the feeding direction A. However, the angle of inclination is optional, but it can be provided in a range of up to 90°, i.e. in a range up to the perpendicular to the feeding direction A, which is substantially parallel to a short side 9. The slits 7 are also formed in the longitudinal direction at regular intervals. If the interval is b, the slits are alternately arranged to be offset by (½) b on the right and left sides and, in the overlapping section 6, the right and left slits 7, 7 are arranged to not overlap.

However, the slits can be arranged to overlap at the overlapping section 6. In this case, it is effective for the overlapping section 6 to be completely welded at a vulcanizing temperature. Since the slits are situated in the same position on the right and left sides, the raw rubber hose 12 can be easily bent when inserted into a mandrel for the vulcanizing process. It is also possible to provide the slits with a different angle and length on the right and left sides. The slits 7 with various structures can be continuously formed when the resin film 5 is molded.

Further, when a length obtained by adding one third (⅓) of the circumferential length (for example, when the inner diameter of a rubber hose is 36.5 mm and the thickness thereof is 3 mm, the added length is 41 mm) of the intermediate layer 2 to the circumferential length is set as the maximum width (i.e. short side measurement) of the resin film 5, it is desirable that slits 7 of a maximum length of 40 mm be provided at equal intervals in the longitudinal direction of the resin film 5 on both sides or one side of the long side sections 8, 8 of the resin film 5.

Figure 5:
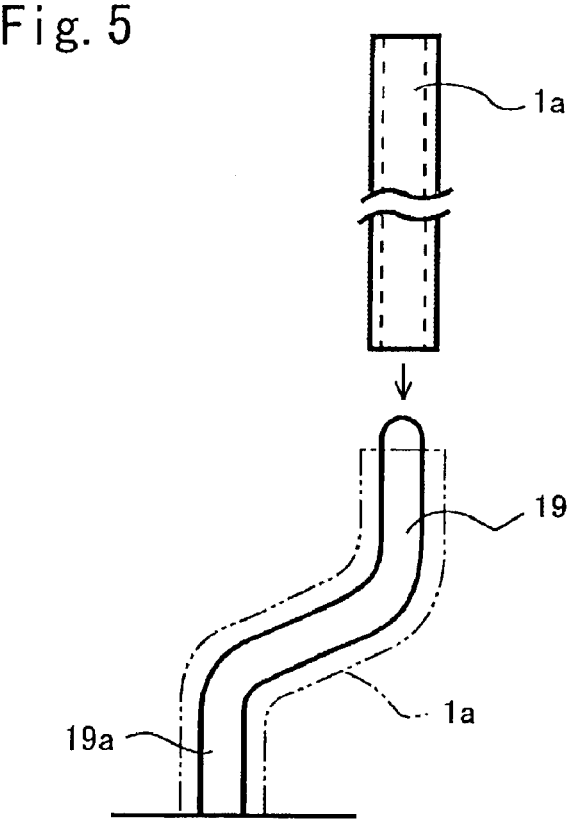
FIG. 5 is a view explaining mounting of a hose on a mandrel in a vulcanizing process.
Figure 6:
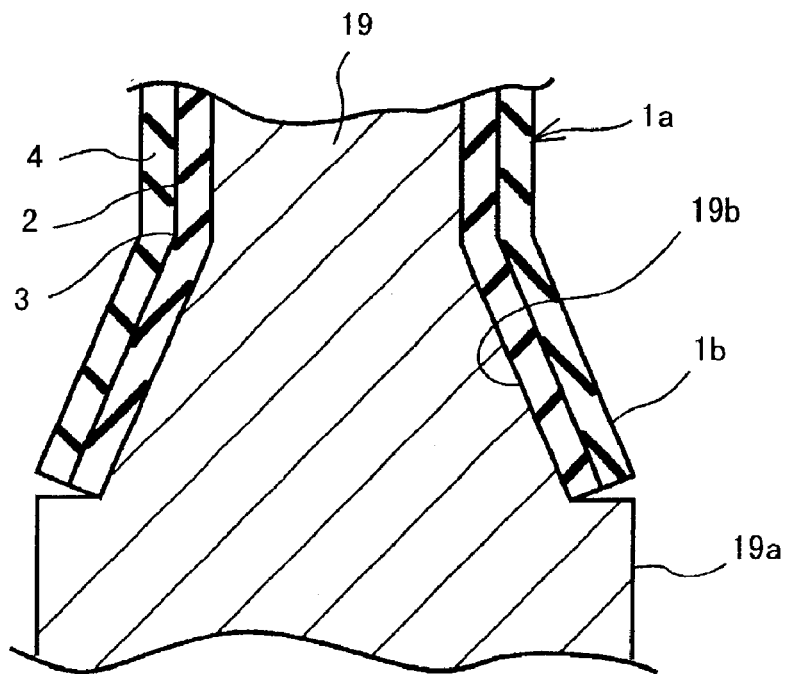
FIG. 6 is a partially expanded cross-sectional view showing a mandrel mounting condition.

FIGS. 5 and 6 show a vulcanizing process for a raw rubber hose 1a obtained by such simultaneous extrusion molding. Namely, the raw rubber hose 1a cut to a predetermined dimension is mounted on a mandrel 19 which has a selectively bent shape as a three-dimensional shape and is vulcanized at a predetermined temperature for a predetermined time. In this manner, a rubber hose product 1 with a bent shape corresponding to the mandrel 19 is obtained.

In this case, as shown in FIG. 6, if the mandrel 19 is provided near the base section 19a of the mandrel 19 with a taper section 19b expanding outward toward the lower section, the end section of the raw rubber hose 1a is also formed with an expanded section 1b of a tapered shape which is similar to the taper section 19b of the mandrel 19. In this manner, it is possible to easily manufacture an expanded hose, to be connected to the rubber hose, of which the outer diameter is different from the inner diameter of the rubber hose.

Operation of the present invention will now be described. In FIG. 3, since the long sided sections 8, 8 are provided with slits 7, these sections 8, 8 form weak sections. Accordingly, when a resin film 5 is fed into an intermediate layer forming section 11 along the feeding direction A, the resin film 5 is deformed to have a conic section C which is an intermediate form for shifting from a planar shape B to a cylindrical shape D. Any strain in the resin film 5 generated in this case can be absorbed by a change of opening conditions of the slits 7.

Accordingly, even though the resin film 5 is made comparatively thick and rigid without flexibility and extensibility for the purpose of improving permeability and pressure resistance, a break or a twist is not generated in the course of the conic section C, wherein a uniform cylindrical shape can be provided within the intermediate layer forming section following the conic section C. As a result, since a uniform cylindrical shape can be maintained even during the simultaneous extrusion molding in an extrusion head 10, it is possible to form a thin hose.

Even in the case of woven fabric reinforced cloth which is superior to the resin film in flexibility and extensibility and of which the cloth end section in the overlapping section is originally difficult to break during extrusion molding, there is some possibility that the cloth end section will break if the overlapping width is too great. In the case of the resin film which is inferior to the woven fabric reinforced cloth in flexibility and extensibility, it is considered that a break will be easily generated in the course of bending into a cylindrical shape from a planar shape. However, by providing a weak section such as slits on the long side sections 8, 8, the resin film can be easily bent and such a break is easily prevented.

Further, within the intermediate layer forming section 11, the long side sections 8, 8 on the right and left sides form an overlapping section 6, wherein the slits 7 on the right and left sides do not overlap and are alternately situated in the longitudinal direction. Accordingly, although the slits 7 are provided, it is possible to prevent permeation through the slits 7 and to maintain good impermeability that is an object of the present invention.

In a condition of the raw rubber hose 1a obtained by such a simultaneous extrusion molding method, at the overlapping section 6 of the resin film 5 forming the intermediate layer 2, the long side sections 8, 8 which overlap are not integrally provided by welding or the like. Accordingly, some displacement is possible between the overlapped sections.

However, since the intermediate layer 2 is integrally embedded between an inner rubber layer 3 and an outer rubber layer 4, it is possible to maintain the overlapping section 6 even though there is deformation due to some displacement or the like. The overlapping measurement (a) (see FIG. 4) is also set to such a degree that the overlapping section 6 can be maintained.

When the raw rubber hose 1a is vulcanized as shown in FIG. 5, the raw rubber hose 1a can be mounted on the mandrel 19 following the bent shape of the latter since the overlapping section 6 is designed to have a flexible structure for permitting the deformation such as displacement.

Next, when the raw rubber hose 1a mounted on the mandrel 19 is vulcanized at a predetermined temperature, the inner layer rubber layer 3 and the outer layer rubber layer 4 are vulcanized and fixed to a bent shape. Since the resin film 5 of the intermediate layer 2 is also melted at the vulcanizing temperature and then hardened, the upper and lower long side sections 8, 8 are integrally welded at the overlapping section 6. In this case, since the slits 7 have disappeared to form a single resin layer, impermeability improves further.

Also, since the slits 7, 7 provided on both the long side sections 8, 8 are alternately formed not to overlap at the overlapping section 6, the slits 7 on one side of the long side sections 8, 8 overlap the sections where no slits are provided on the other side at the overlapping section 6. As a result, no internal solution permeates through the slits 7.

However, the slits 7, 7 provided on both the long side sections 8, 8 can be provided in such a position that they overlap at the overlapping section 6. In this case, the resin film. 5 can be easily bent into a cylindrical shape compared with the case where the slits are alternately provided. Even though the slits 7, 7 provided on both the long side sections 8, 8 overlap at the overlapping section 6, the slits 7, 7 are melted and welded when vulcanized and finally disappear. As a result, no internal solution permeates through the slit sections.

As shown in FIG. 6, an expanded section 19b can also be easily formed by a flexible structure at the overlapping section 6. If the raw rubber hose is semi-cured (semi-vulcanized) soon after extrusion to increase the rubber hardness, the raw rubber hose can be easily inserted into the mandrel. The raw rubber hose can also be vulcanized on the mandrel.

Further, if the resin film 5 is formed to have a multilayered structure of two to five layers and the melting point of the resin film of at least an innermost layer or an outermost layer is lower than the vulcanizing temperature of the raw rubber hose 12, it is possible to weld the overlapping section 6 and slits 7 of the resin film 5 in the vulcanizing process. When a resin of which the permeability resistance is superior, but the melting point is low, is used, the resin with a low melting point can also be used by laminating a resin of which the heat resistance is superior to both sides of the resin of low melting point.

Close contact between the intermediate layer 2 and the inner layer rubber 3 and outer layer rubber 4 at the overlapping section 6 and at sections other than the overlapping section 6 is maintained until completion of molding under pressure reduced during extrusion. Accordingly, it is possible to manufacture a thin hose such as has been difficult until now. For example, when the film 5 is 0.2 mm thick, it is possible to set the thickness of the inner layer rubber 3 at 0.8 mm, the thickness of the outer layer rubber 4 at 1.0 mm and the entire thickness at 2.0 mm. Further, the entire thickness of the inner layer rubber 3, the intermediate layer 2 and the outer layer rubber 4 can be about 3 to 500 times as thick as the entire thickness of the intermediate layer 2. However, it is desirable that the entire thickness of the inner layer rubber 3, the intermediate layer 2, and the outer layer rubber 4 be about 20 times as thick as the entire thickness of the intermediate layer 2 for the purpose of obtaining a thin hose.

Figure 7:
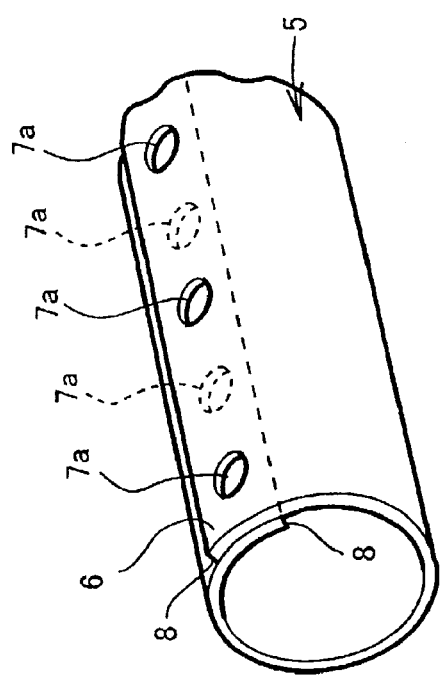
FIG. 7 is a perspective view of an intermediate layer according to a second embodiment (FIGS. 7 and 8)
Figure 8:
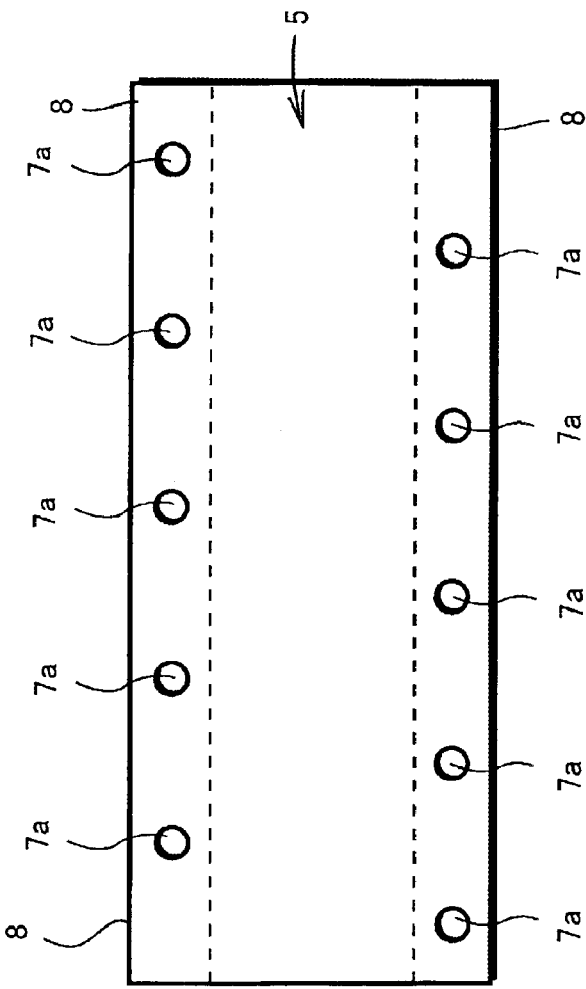
FIG. 8 is a view showing a resin film in the extended shape.

As is obvious from FIGS. 7 and 8, punched holes 7a are formed at fixed intervals in the longitudinal direction at a section (i.e. an overlapping section) where the long side sections 8, 8 overlap. The punched holes 20 are alternately provided not to overlap on the right and left sides.

Since it is possible to make the long side sections 8, 8 weak flexible sections in such a manner, the same function as the slits can be expected. The punching holes 7a can also be continuously formed when the resin film 5 is molded.

Figure 13:
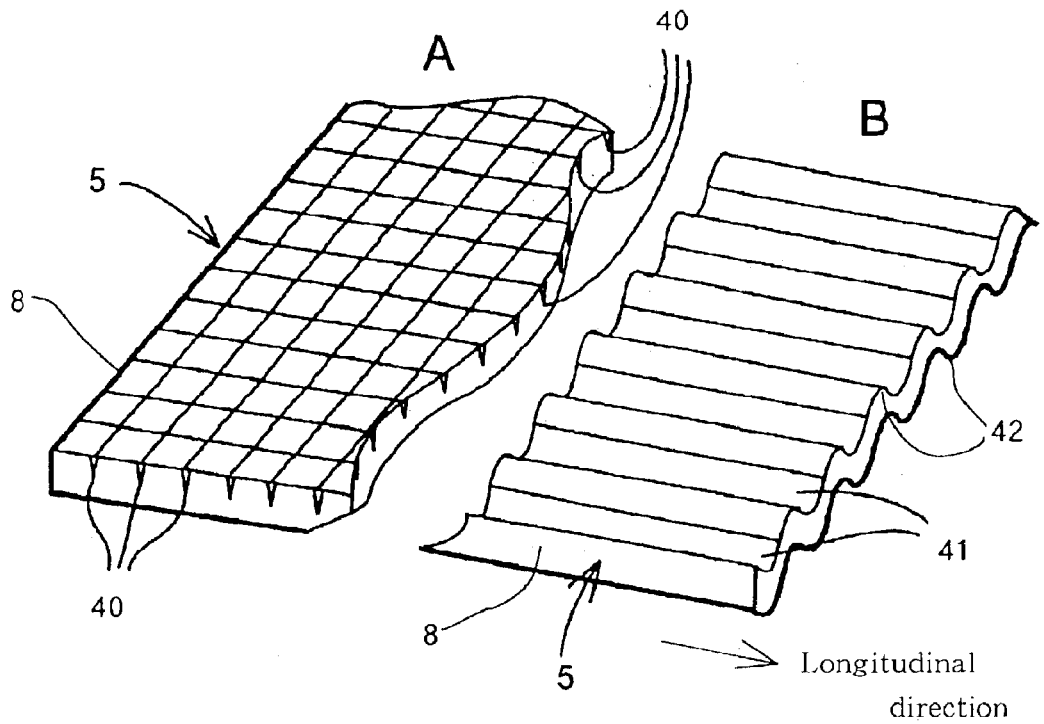
FIG. 13 is view showing a structure of an overlapping section according to a third embodiment.
Figure 14:
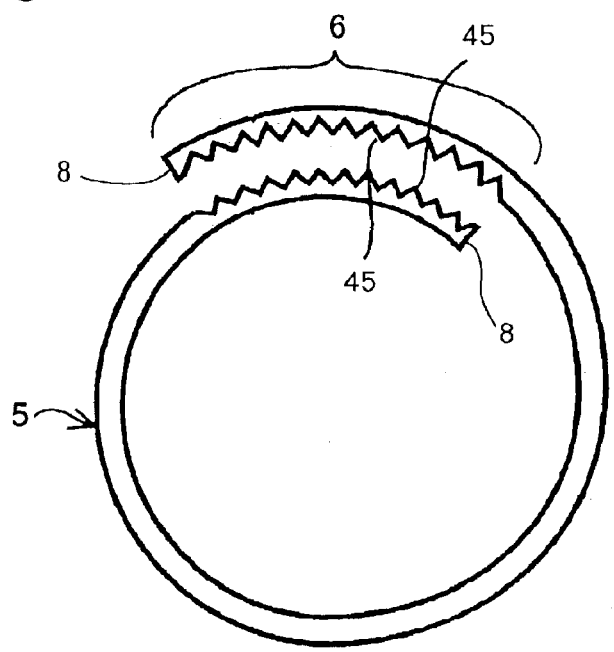
FIG. 14 is a view showing a joint structure of an overlapping section according to a fourth embodiment.
Figure 29:
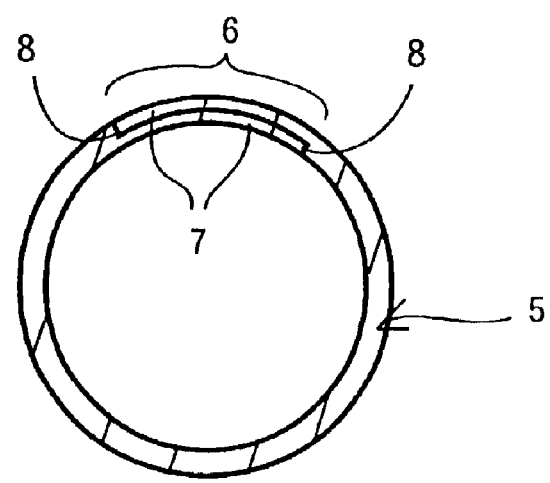
FIG. 29 is a cross-sectional view showing a condition in which a resin film is rounded.
Figure 31:
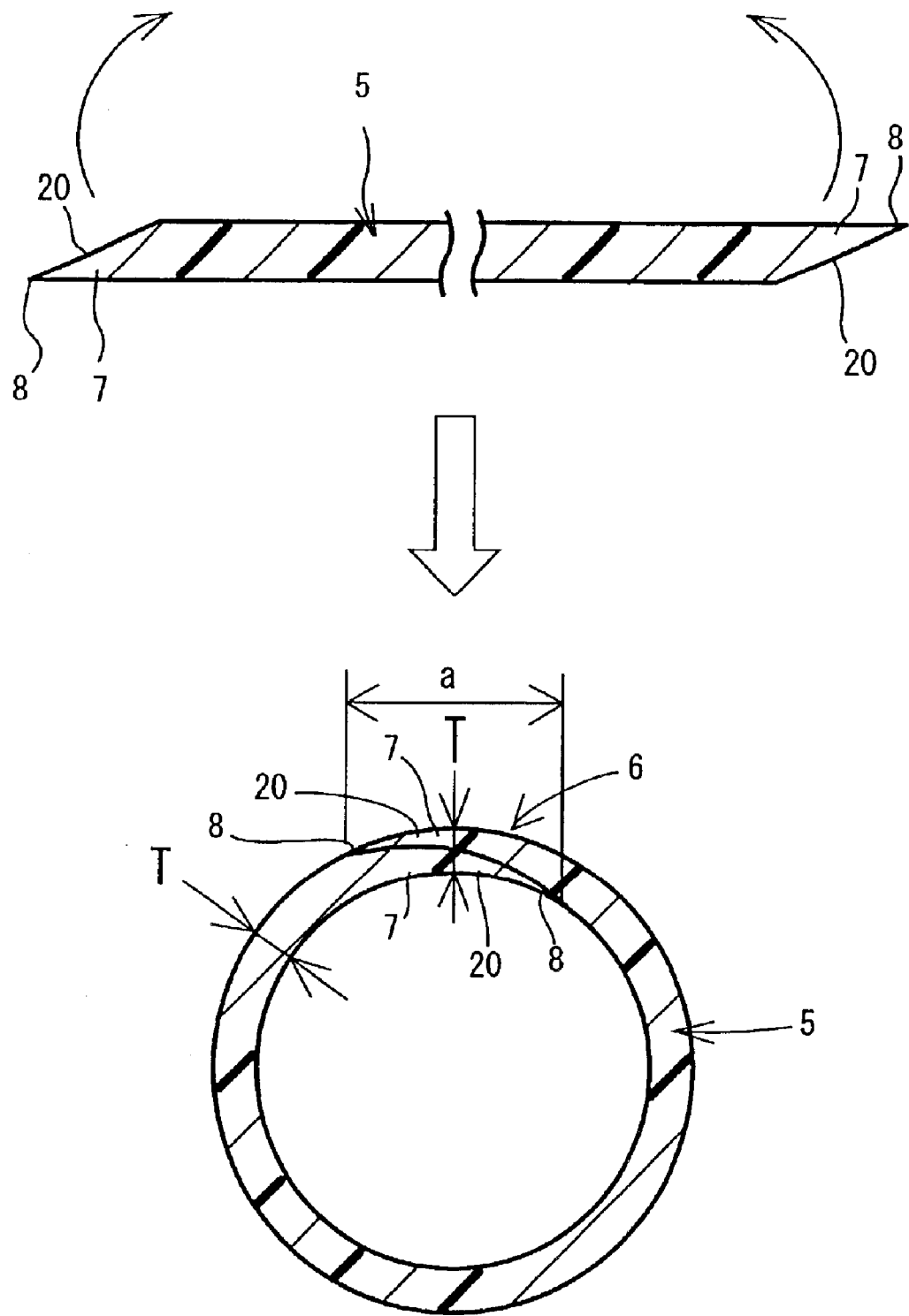
FIG. 31 is an end view of an intermediate layer according to a thirteenth embodiment (FIGS. 31 and 32)

As other examples of the weak section, there are irregularities shown in FIGS. 13 and 14, a step-like thin section shown in FIG. 29, a tapered thin section shown in FIG. 31 and the like. These examples will be described hereinafter.

Figure 9:
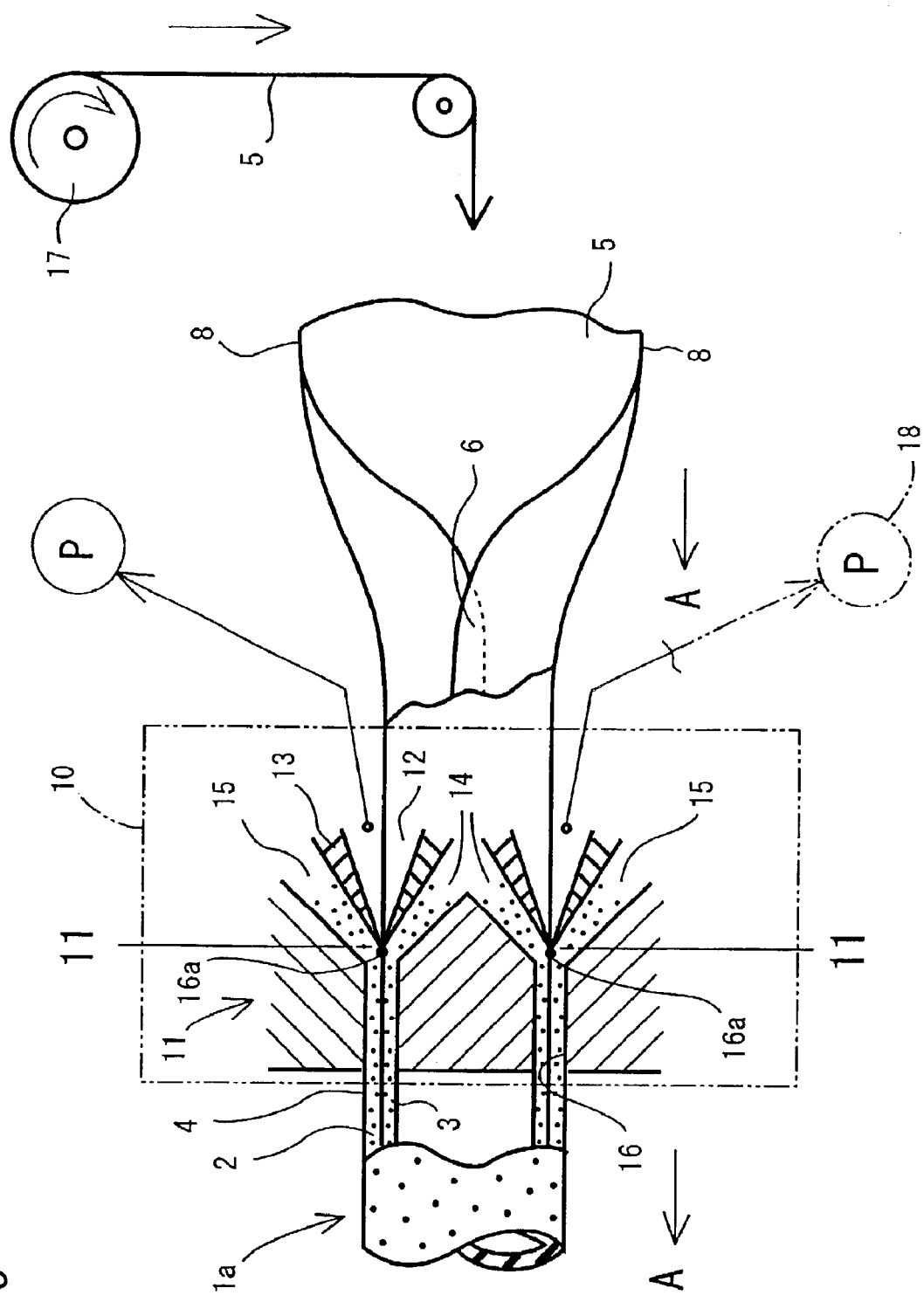
FIG. 9 is a view showing an entire molding device of a second embodiment.

The principle of a method for molding the rubber hose by the bending treatment within an extrusion head is explained by FIG. 9. First, a belt-shaped film 5 is continuously fed to an extrusion-molding machine 10 from a raw film roll 17, wherein the film 5 is rolled up into a cylindrical shape to be fed to an intermediate passage 12 of an extrusion head 11. The intermediate passage 12 is a passage for feeding the film 5 and is provided between an intermediate layer forming section 13 which is part of the extrusion head 11. An inner passage 14 for an inner layer is provided inside the intermediate layer forming section 13 and an outer passage 15 for an outer layer is provided outside the intermediate layer forming section 13. Raw rubber is fed to each passage to form inner and outer layers. These three passages are joined at the junction 16a in the vicinity of the inlet of a collective passage 16. The raw rubber passes through the collective passage 16 and is extruded from there as a rubber hose 1 in which three layers are integrally formed.

By connecting a vacuum pump 18 serving as a pressure reduction device to the intermediate passage 12, the intermediate passage 12 is reduced to a predetermined level of pressure lower than atmospheric pressure. The pressure reduction extends to the collective passage 16 through the intermediate passage 12. Accordingly, the inner and outer layers 3, 4 are integrally laminated on the intermediate layer 2 by increasing their degree of adhesion to the intermediate layer 2. Two vacuum pumps 18 are shown in the figure for the sake of convenience, but the actual intermediate passage 12 is a single ring-shaped passage to which one vacuum pump 18 is connected.

The rubber hose 1 in a condition directly after extrusion molding is performed as an unvulcanized or semi-vulcanized raw rubber hose 1a to be vulcanized later. The extruded raw rubber hose 1a is cut to a predetermined dimension and vulcanized by a method shown in FIG. 6.

Figure 10:
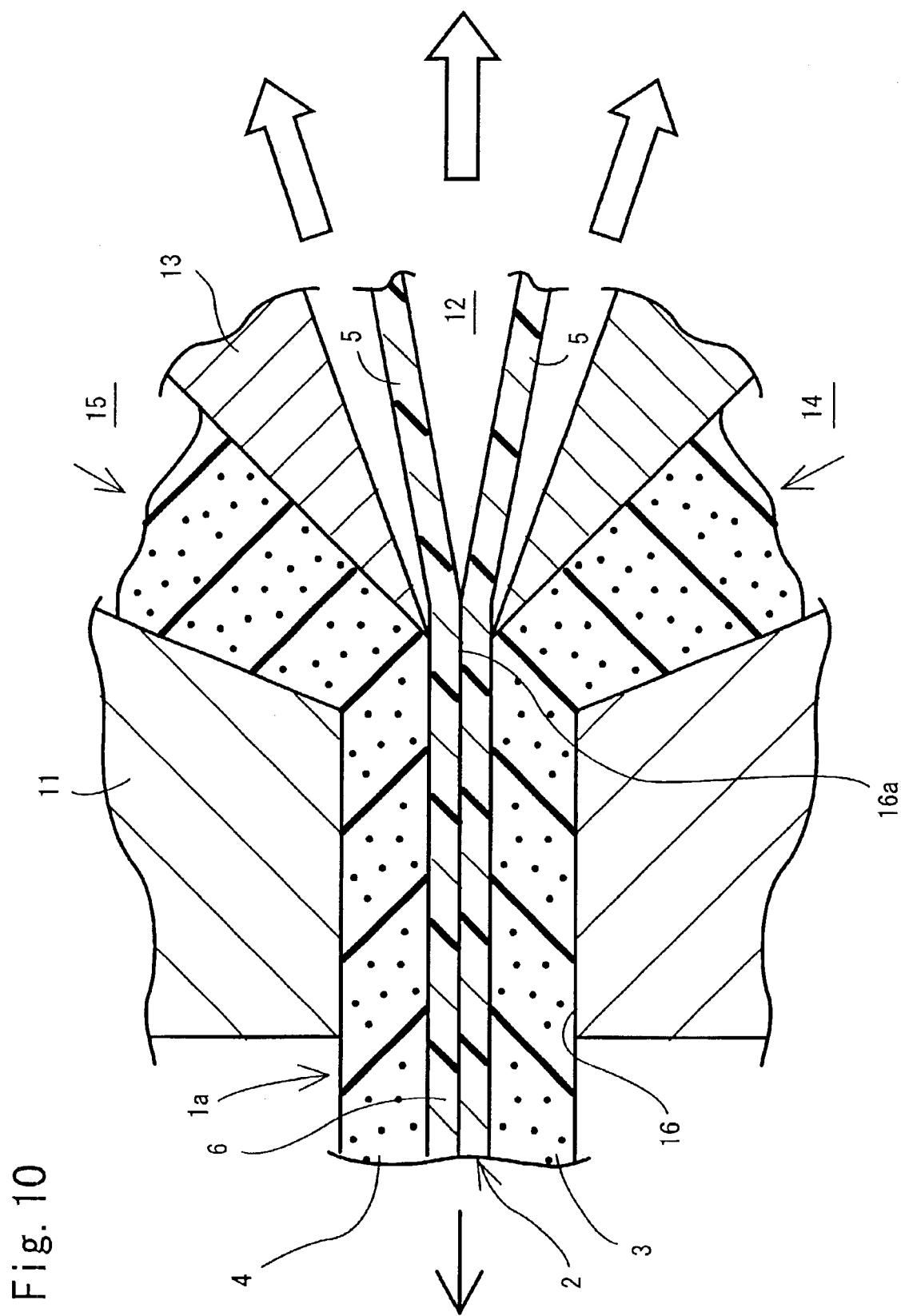
FIG. 10 is an enlarged cross-sectional view of an essential part within an extrusion head.
Figure 11:
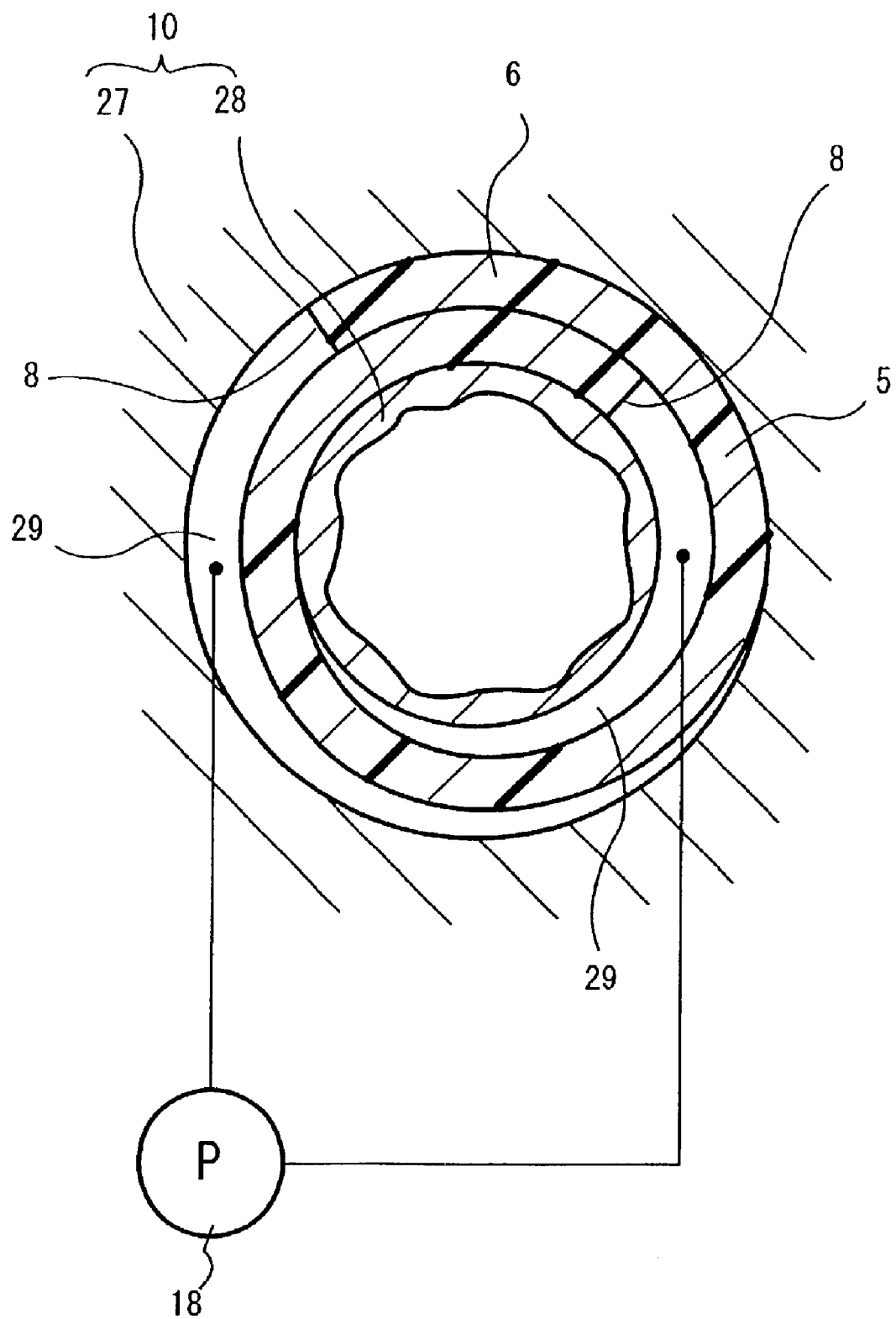
FIG. 11 is a cross-sectional view taken along the line 11—11 of FIG. 9.

FIG. 10 is an enlarged cross-sectional view for partially explaining an overlapping section 6 in the vicinity of the junction 16a of FIG. 9. FIG. 11 is a cross-sectional view taken along line 11—11 of FIG. 9 to show the condition of the intermediate layer 2 within the intermediate layer forming section 13. As shown in these figures, the intermediate layer forming section 13 is tapered toward the junction 16a and an opening width of an intermediate passage 12 on the outlet side facing the junction 16a is about the thickness of the overlapping section 6.

Accordingly, on the outlet side of the intermediate passage 12, the upper and lower films 5, 5 forming the overlapping section 6 are caused to come into close contact by the intermediate layer forming section 13. Since the intermediate passage 12 is decompressed in the pressure reduction direction schematically shown by arrows on a colored background of FIG. 10, pressure between the upper and lower films 5, 5 is also reduced at the overlapping section 6 to provide strong adhesion therebetween. As a result, foreign materials such as volatile matter in the overlapping section 6 are drawn out and removed. Accordingly, it is possible to prevent generation of a phenomenon whereby the volatile matter content expands to form bubbles at the time of heating in the subsequent vulcanizing process.

Further, as shown in FIG. 11, a small space 29 is formed between a section of the film 5 other than the overlapping section 6 and a section of the intermediate passage 12 on the exit side. Accordingly, pressure on the junction 16a shown in FIG. 10 can also be reduced at the same time by a vacuum pump 18 connected through the space 29 to the intermediate passage 12.

The film 5 is fed into the junction 16a in a condition in which a section of the upper and lower films 5, 5 at the overlapping section 6 is decompressed and caused to adhere, wherein the inner layer rubber 3 and the outer layer rubber 4 are integrally formed. Accordingly, even with such a hard film 6 whereby the overlapping section 6 does not adhere, it is possible to positively allow the overlapping section 6 to adhere for simultaneous extrusion molding. Since bending treatment within the extrusion head is possible, highly efficient mass-production can be realized.

In this case, as is obvious from FIG. 10, a high vacuum condition is maintained up to the junction 16a. Accordingly, it is possible to eliminate gas such as air, or foreign materials such as volatile matter content, and to allow the inner layer rubber 3 and the outer layer rubber 4 to be integrally formed with the intermediate layer 2 with a high degree of adhesion. It is also possible to prevent generation of a phenomenon whereby the volatile material content expands to form bubbles during heating in the subsequent vulcanizing process. Further, since the high vacuum is maintained up to the conjunction 16a, the outer layer rubber 4 and the inner layer rubber 3 also receive the force in the direction in which they come close and it is possible to integrally form them together with high adherence strength.

A raw rubber hose 1a extrusion-molded in such a manner is cut to the necessary length after cooling and stored until vulcanization. Adhesion between the intermediate layer 2, the inner layer rubber 3 and the outer layer rubber 4 at the overlapping section 6, and at the section other than the overlapping section 6, is maintained under the reduced pressure when extruded. No treatment is given to the hose end surface after cutting, but since the rubber of the inner and outer layer apply bearing stress to the film contacting surface, no phenomenon whereby the atmosphere or a water content permeates into the overlap of the film occurs. The adhering condition at the overlapping section can be maintained even during storage of the raw rubber hose.

As shown in FIG. 6, adhesion of the overlapping section 6 under decompression is maintained until vulcanizing is completed. It is therefore possible to prevent displacement or opening of the overlapped section between contacting surfaces. Further, when the overlapping section 6 is welded at the vulcanizing temperature by vulcanizing after mounting on the mandrel 18, no gap is produced at the overlapping section 6 because adhesion is maintained. Since the overlapping section 6 is completely integrated from that point, permeability resistance and pressure resistance can be favorably maintained.

Accordingly, even though a hard film is used which can satisfy predetermined demands such as high permeability resistance and pressure resistance which are required, for example, in a fuel hose, simultaneous extrusion molding can not only satisfy permeability resistance, pressure resistance or the like, but also provide a method that has excellent mass-productivity.

Table shows the relationship between the film bending load and the condition of the overlapping section in the process from extrusion molding to vulcanizing, wherein a ○ is marked when the overlapping section did not open and an X is marked when it opened. A comparative example 1 shows a case where bending treatment within the extrusion head was performed without pressure reduction. An embodiment 1 is a case where the bending treatment within the extrusion head was performed when pressure was reduced to the negative pressure of 98658 Pa (namely 740 mmHg) below the atmospheric pressure. As is obvious from this Table, in the comparative example 1, when the film bending load is 400 N or more, the result was X (not suitable), but in the embodiment 1, processing between 5000 N and 10000 N is possible. This means that a hard film having high bending modulus, i.e. the strong elasticity and rigidity, in other words, a hard film that can attain high permeability resistance and pressure resistance, can be used.

An embodiment 2 in FIG. 1 is an example using the bending treatment outside the extrusion head where the film 5 is shaped to be bent in a lateral direction in advance by a means other than the extrusion head in front of the inlet of the extrusion head 11. Comparison with the embodiment 2 will be described hereinafter.

TABLE

| Film bending load (*) | Comparative example | Embodiment 1 | Embodiment 2 |
|---|---|---|---|
| 250 N | ○ | ○ | ○ |
| 400 N | X | ○ | ○ |
| 5000 N | X | ○ | ○ |
| 10000 N | X | X | ○ |
| 20000 N | X | X | ○ |

○: No opening formed at overlapping section;
X: Opening formed at overlapping section.
(*): Film bending load is a measure converted from bending modulus of the film material in the cross section of which the width is 100 mm and the thickness is 0.05 mm.
Molding conditions
Comparative example: Bending treatment within extrusion head, molded at atmospheric pressure.
Embodiment 1: Bending treatment within extrusion head, molded at 98658 Pa (740 mmHg) below the atmospheric pressure.
Embodiment 2: Bending treatment outside extrusion head, molded at: 98658 Pa (740 mmnHg) below the atmospheric pressure.

Figure 12:
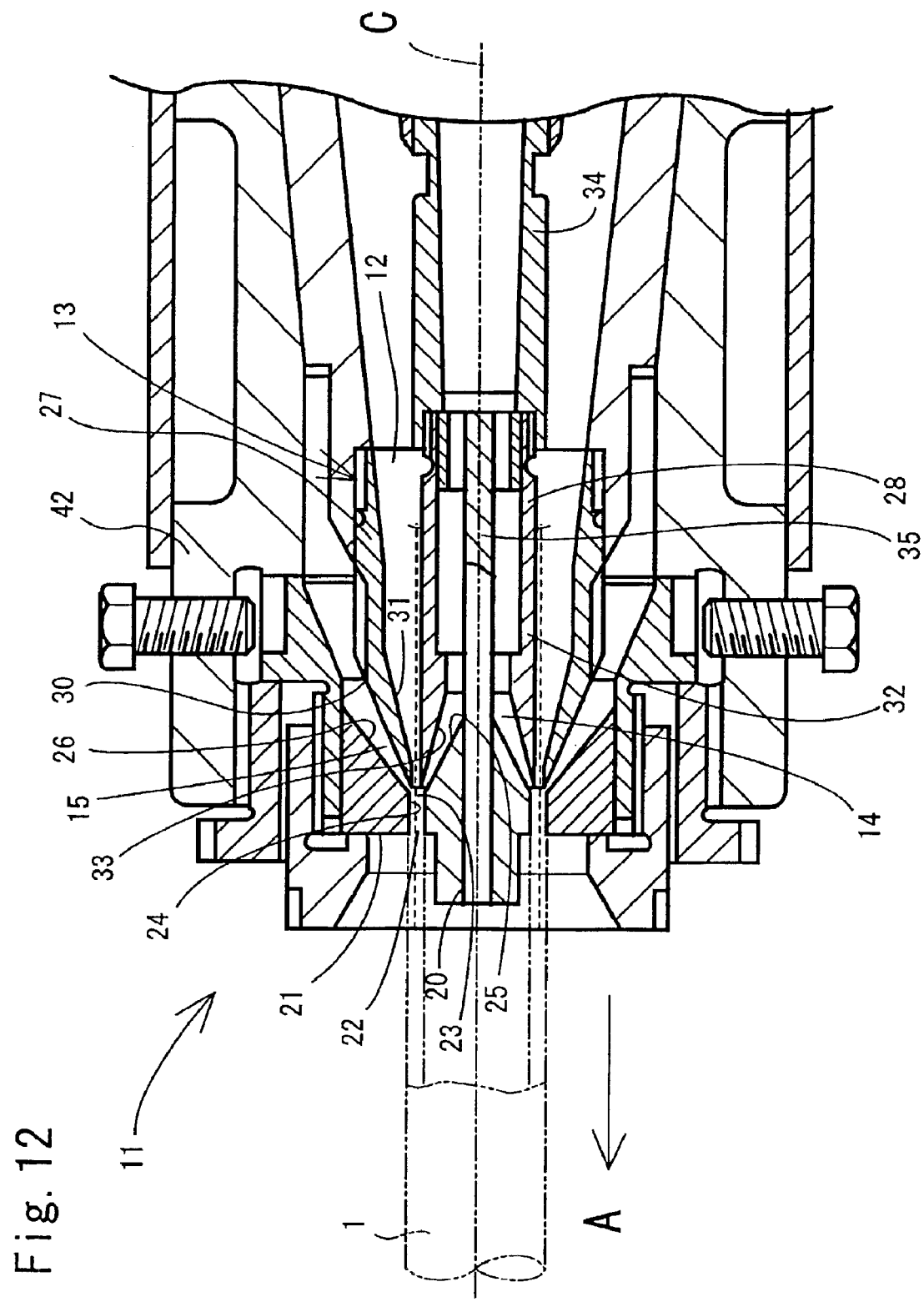
FIG. 12 is a detailed cross-sectional view of the extrusion head.

FIG. 12 is a cross-sectional view showing one specific example of the extrusion head 11. As is obvious from this figure, the front end of the extrusion head 11 is provided with a core 20 and a die 21 surrounding the periphery of the core 20. Provided between the outer circumference of the core 20 and the inner circumference of the die 21 is a circular slit 22 for extruding the rubber hose 1. The circular slit 22 is concentrically provided with the outer circumference of the core 20 and the inner circumference of the die 21.

The outer circumferential surface of the core 20 and the inner circumferential surface of the die 21 are respectively provided with linear cross-sectional sections 23, 24 parallel to the extrusion axis C. Each rear section of the linear cross-sectional sections 23, 24 continuously extends to an ascending slope 25 which inclines to expand outwardly relative to the extruding direction A and a descending slope 26 which inclines inwardly.

Provided within a space formed to expand backward between the ascending slope 25 and the descending slope 26 are a substantially cylindrical outer cylindrical section 27 of which the top is tapered off and an inner cylindrical section 28 of which the top is tapered in the expanding direction and which is provided concentrically inside the outer cylindrical section 27. The outer cylindrical section 27 and inner cylindrical section 28 form an intermediate layer forming section 13. The outer cylindrical section 27 is provided with an outer peripheral slope 30 and an inner peripheral slope 31. The outer peripheral slope 30 is arranged to face the descending slope 26 leaving a space therebetween, and an outer passage 15 of which the top is tapered off relative to the extruding direction A is formed between the outer peripheral slope 30 and the descending slope 26.

The inner cylindrical section 28 is provided with an outer peripheral surface 32 of a straight cross-section and an inner peripheral slope 33. The outer peripheral surface 32 forms an intermediate passage 12 of which the top is tapered off relative to the extrusion direction A between itself and the inner peripheral slope 31 of the outer cylindrical section 27. The inner peripheral slope 33 is arranged to face the ascending slope 25 leaving a space therebetween and forms an inner passage 14 of which the top is tapered off relative to the extrusion direction A.

Reference numeral 34 in the figure is a back joint which forms a part of the inner passage 14 and concentrically holds the outer cylindrical section 27 and the inner cylindrical section 28. The back joint 34 also supports the core 20 through an axial center section rod 35. Reference numeral 36 is a casing for supporting the die 21.

FIG. 13 is a third embodiment relating to a structure of the overlaping section. In FIG. 13A, lattice-shaped grooves 40 are provided on at least the overlapping section which are freely bendable. Irregularities such as embossment may be provided in place of the grooves 40. In FIG. 13B, wave-shaped irregularity consisting of recesses 41 and convex sections 42 extending in the vertical direction (in the longitudinal direction parallel to the long side sections) are provided. With this construction, the resin film 5 is easily bent at the recesses 41.

FIG. 14 shows a fourth embodiment relating to an overlapping section 6, in which rough surfaced sections 45 consisting of a minute recessed section or convex section, or of irregular sections are formed at an overlapping section of both end sections on the long sides using a surface roughening method. Since friction at the overlapping section 6 is increased by the rough surfaced sections 45, displacement is not easily caused. As the surface roughening method, there are a suitable mechanical method such as shot-blasting, a method for roughening a surface by chemical treatment and the like. The rough surfaced section is also allowed to be the weak section.

Figure 15:
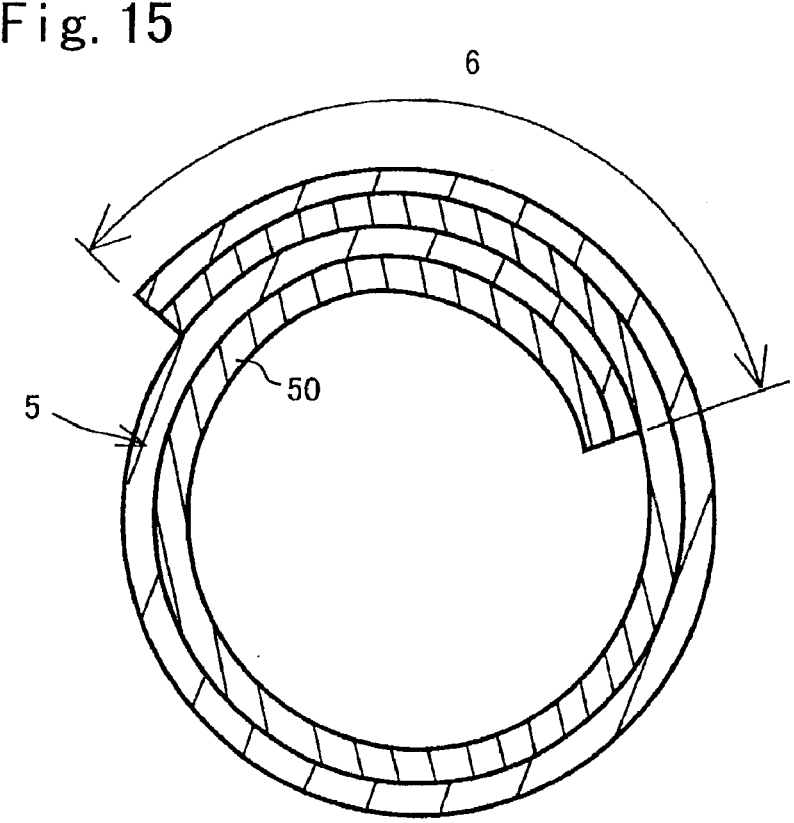
FIG. 15 is an end view of an intermediate layer according to a fifth embodiment (FIGS. 15 and 16)
Figure 16:
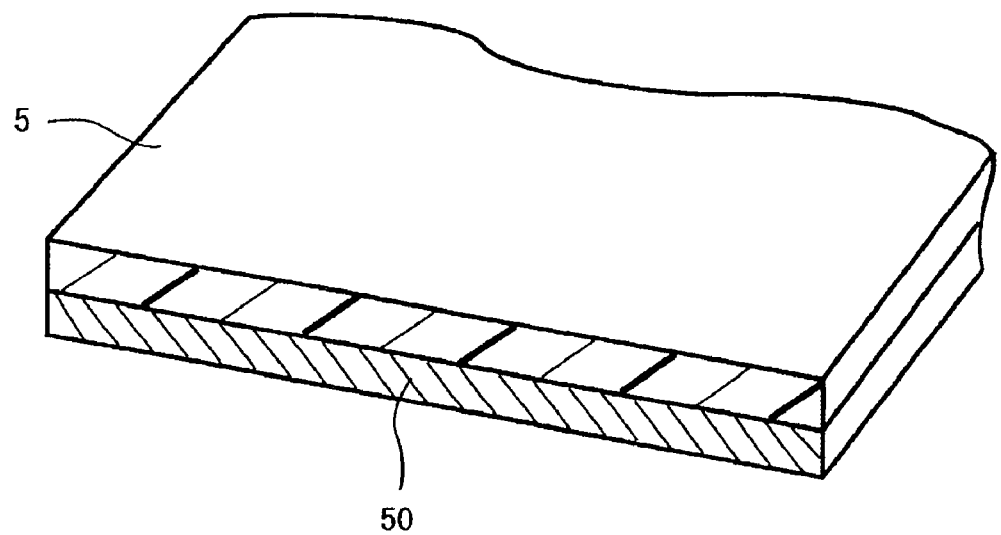
FIG. 16 is an extended perspective view of a resin film.

FIG. 15 is an end view of a resin film 5 which is formed in a cylindrical shape according to a fifth embodiment and FIG. 16 is an extended perspective view of the resin film 5. As is obvious from these figures, a metal film 50 is laminated to the resin film 5 to provide a laminated structure, wherein the metal film 50 is arranged to face inside. Both films are bonded at an overlapping section 6 by a suitable adhesive. However, if the metal film 50 is integrally embedded in the resin film 5, it is possible to integrally form the overlapping section 6 by welding.

Such a laminated structure can be provided in various manners, in which the resin film 5 can be a multilayered structure of from two layers to a maximum of about five layers. As a result of the multilayered structuring, characteristics of different resins can not only be compensated for, but also generation of pinholes in the resin film production process can be reduced. The entire thickness of the multilayered structure exhibits the same performance as a single layer film and can be further thinned.

The resin film 5 of such a multilayered structure includes for example, a resin single layer such as a fluororesin (monopolymer, bipolymer, and terpolymer), PVDC, PVC, PVA, PPS, PET, PBT, PA6, PA66, PA11, PA12, PP, HDPE, LLDPE, LDPE, or an ethylene-vinyl alcohol copolymer, or a resin laminated body consisting of two to five layers made of different materials; a single body of metal sheet alone such as aluminum or a laminated body consisting of two to six layers made of the above resin and an aluminum sheet. In addition, there is another laminated body in which a laminated body consisting of two to six layers in which aluminum, alumina, or silica has been deposited on the above resin single layer or the laminated body is treated as a film intermediate layer, wherein a fiber-reinforced layer such as aramid-fiber, PA6, PA66, PET, PBT, PPS or PVA is added to the inner layer hose side of the film intermediate layer.

In this laminated body, it is desirable that at least an innermost or outermost resin layer be constructed using a resin of which the melting point is lower than the vulcanizing temperature and the entire thickness of the intermediate layer 2 be in a range of 0.01 mm to 1.00 mm.

Reinforced cloth can be added to the intermediate layer for improvement of pressure resistance and can be chosen from aramid-fiber, PA6, PA66, PET, PPS, PVA, or the like depending on use. A main role of the reinforced cloth is to maintain the pressure resistance, but it is desirable that fibers with excellent performance relating to strength, heat resistance, flexing resistance, absorptivity, resistance, or hydrolytic resistance be used.

There are various weaving structures for fibers such as raschel knitting, plain weave or the like. Wherein, a weaving structure is desirable which is thin and has the pressure-resistance performance and of which change of outer diameter are small. When the resin or metal film and the fiber-reinforced layer are laminated, it is desirable that they be laminated in advance for use. When the resin or metal film and the fiber-reinforced layer are extruded without lamination, molding failure or breaking of the film layer due to displacement between the film and the reinforced cloth is easily generated. The lamination structure of a laminated body of the resin or metal film and the fiber-reinforced layer consists of two layers to a maximum of about six layers.

If the thickness of a rubber layer is simply reduced for the purpose of thinning of the hose, the amount of permeation increases in a form inversely proportional to the reduction. Factors such as rubber material and kind of internal solution, thickness of material and gas permeability of material, atmosphere temperature, internal pressure and the like affect the permeation of the contents. Material factors for affecting the gas permeability include polarity, degree of crystallinity, orientation, crystal structure and the like. A resin is generally better than rubber for gas permeability for the same thickness, except fluorocarbon rubber. To make the best use of the gas permeability resistance of the film, it is desirable that the entire thickness of a film laminated body and/or a laminated body of the film and the fiber-reinforced cloth be 0.01 mm~1.00 mm. If the thickness is larger than 1.00 mm, even though the slits are provided, it is difficult to mold the film in a cylindrical shape during extrusion. This also affects flexing properties of the hose and conflicts with thinning of the hose.

When a rubber layer of hose with a reinforced cloth is thinned, compressive strength, pressure resistance and durability tend to deteriorate and it is obvious that not only the reinforced cloth, but also tensile strength and elastic modulus of the rubber layer itself have a great influence on the strength of the hose. When the rubber thickness of a hose with the reinforced layer is reduced, the amount of deformation when stress is applied increases. Accordingly, in such a condition in which repeated stress is applied, pressure resistance, durability and strength deteriorate. When the rubber layer is thinned, sealing properties also deteriorate.

Permeability of a rubber hose with the reinforced cloth in the intermediate layer substantially depends on the material and thickness of the rubber layer and a degree of contribution by the reinforced cloth to permeability is low. Permeation is a phenomenon of penetration and diffusion of the contents in the rubber layer in a micro-level field, wherein the contents easily pass through a gap in the reinforced cloth composed of yarn. On the other hand, when the resin film is added to the reinforced cloth, the film functions as a barrier layer in a micro-level and as a result, permeability remarkably improves. Further, if the resin film is laminated with an inorganic material such as aluminum or ceramic or deposited film is used, complete impermeability of inner solution or inner gas is realized.

A thermoplastic resin film is stretched and oriented in all directions in the manufacturing process, but has creep characteristics. Accordingly, if a stress load is continuously applied for a long time, there is some possibility that deformation is caused. If orientation is intensified, tensile strength in the orientation direction increases, but, on the contrary, tear resistance and pinhole resistance deteriorate. It is therefore necessary to use a resin that has excellent pressure resistance and heat resistance in a predetermined thickness in the intermediate film layer. However, by adding one fiber-reinforced layer, it is possible to improve the pressure resistance, thinning the film layer. Because the reinforced cloth has a weaving structure obtained by twisting a single yarn which is strongly stretched and oriented in the longitudinal direction the stress in a predetermined range can be retained by stretching deformation of the weaving structure itself and any stress greater than the predetermined range can be retained by the tensile strength of the yarn itself.

Figure 17:
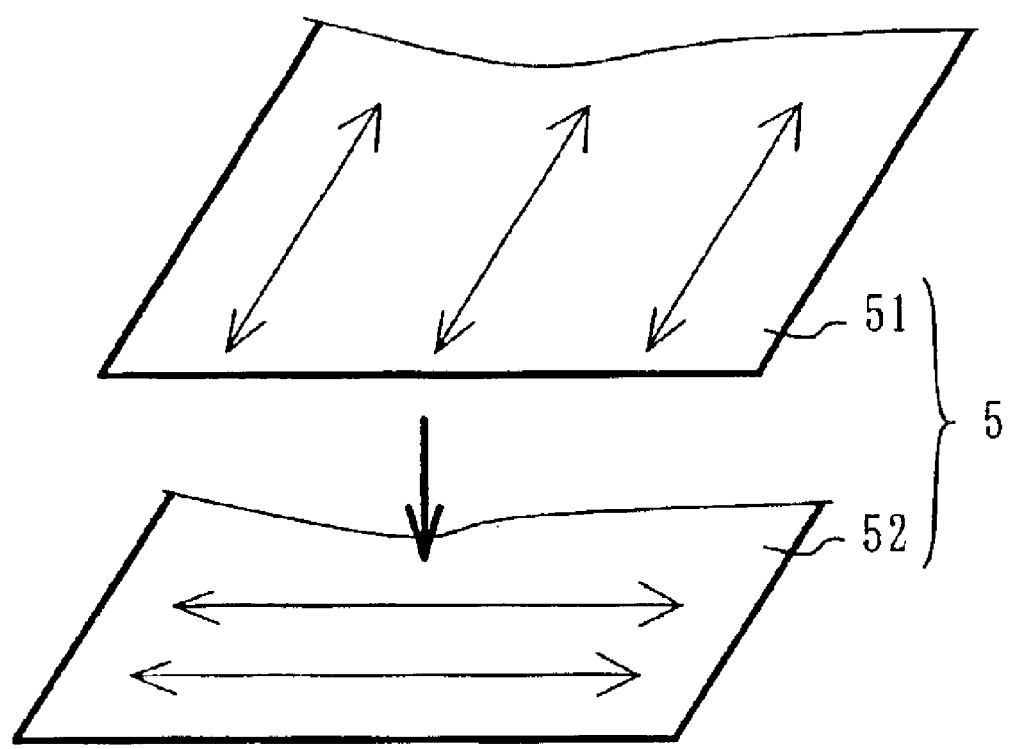
FIG. 17 is a view showing a structure of a lamination film according to an sixth embodiment.

FIG. 17 shows an sixth embodiment adopting a laminated film, in which resin films 51, 52, of which the orientation direction and the stretching direction meet at right angles, are laminated. In this manner, the laminated film can be easily bent to form a cylindrical shape or bent in the longitudinal direction after forming the cylindrical shape, wherein sufficient strength can be secured.

Figure 18:
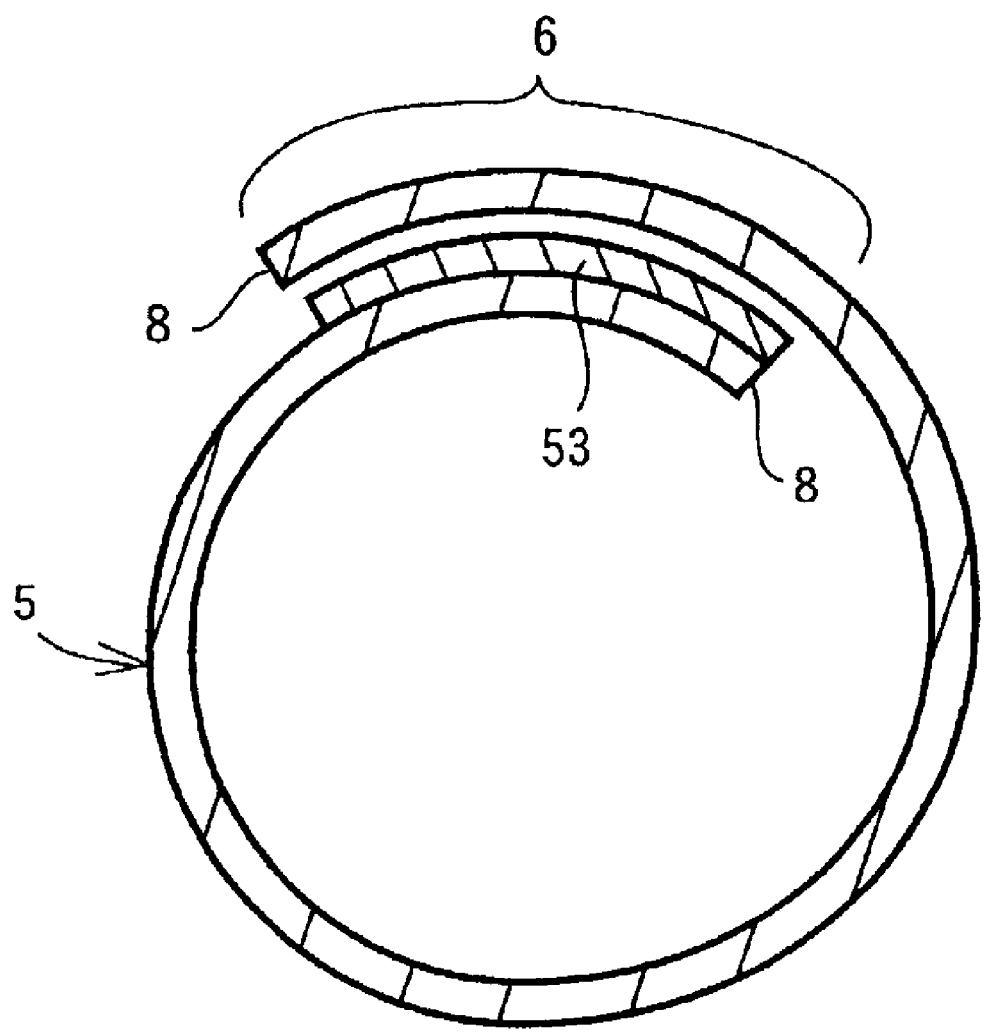
FIG. 18 is a view showing a joint structure of an overlapping section according to a seventh embodiment.

FIG. 18 shows a seventh embodiment relating to the joint of an overlapping section 6, in which an adhesive agent layer 53, which has excellent fuel oil resistance characteristics, is inserted between the overlapping sections. In this manner, better sealing can be provided against permeation of the fuel oil by the adhesive agent layer 53. If the adhesive agent layer 53 is a hot melt type, this is convenient because adhesion is made at the same time as joining the overlapping section 6 by heat welding.

To improve workability after extrusion molding in the case where the film of high bending modulus is used, it is possible to use a mixture of 2~30 parts by weight of a thermoplastic resin to 100 parts by weight of a rubber material. Resins for mixing can be chosen from PP, PBT, polymethyl pentene, PS or the like.

In this manner, if the resin in the rubber material is non-compatible with the rubber, the resin remains contained in the rubber even after vulcanizing. Since the resin in the vulcanized rubber has the property of thermoplasticity, it exhibits plasticity if the temperature is greater than the softening point. On the other hand, the vulcanized rubber, once vulcanized, does not lose the property of rubber elasticity. Now, by mixing the rubber with the thermoplastic resin, if the vulcanized rubber is heated again to the softening point after vulcanizing to deform and then cooled, it can retain its shape after deformation. Deformation can be eliminated if heated again. Specifically, the rubber is semi-vulcanized directly after extrusion to increase the rubber hardness so that it can be easily mounted on the mandrel. The rubber is fully vulcanized after mounting on the mandrel.

Thus, it is possible to improve the problems of rubber hose productivity by reducing various problems such as creases or twists at the bent R section, collapse of the end surface, or adherence of work glove marks on the hose surface generated when the hose is mounted on the mandrel.

FIG. 19 shows a eighth embodiment in which the composition of the rubber has been changed. An inner rubber layer and an outer rubber layer according to the present embodiment are mixed with a thermoplastic resin. An intermediate layer described in the previous embodiments is selectively used. In such a material composition, a raw rubber hose 1a is extruded and then vulcanized. The vulcanized hose is mounted on a mandrel 19 and heated close to the melting temperature of the thermoplastic resin and then cooled.

Thanks to softening of the thermoplastic resin, the hose follows the shape of the mandrel 19 by and is bent to that shape. This bent shape is set through the subsequent cooling. In this manner, even though vulcanization is preceded, the subsequent shaping is possible. Since the overlapping section can be stabilized by vulcanization, even though the hose is freely bent at the mounting stage on the mandrel 19, it is possible to maintain the intermediate layer in the cylindrical shape.

As a composition example, the mixture of 2~30 parts by weight of the thermoplastic resin such as PP, PBT, Polymethyl pentene or PS (polystyrene) to 100 parts by weight of rubber material is possible. By using this mixture, it is possible to further improve workability and performance of the rubber hose.

If the thermoplastic resin in the rubber material is non-compatible with the rubber, the resin content remains contained in the rubber even after vulcanization. Since the resin in the vulcanized rubber has the property of thermoplasticity, it exhibits plasticity if the temperature is greater than the softening point. Accordingly, the vulcanized rubber, once vulcanized, does not lose the property of rubber elasticity permanently. However, if the vulcanized rubber is heated again to re-deform after vulcanization and then cooled, it can retain the shape after re-deformation. Re-deformation can be eliminated if heated again.

Figure 20:
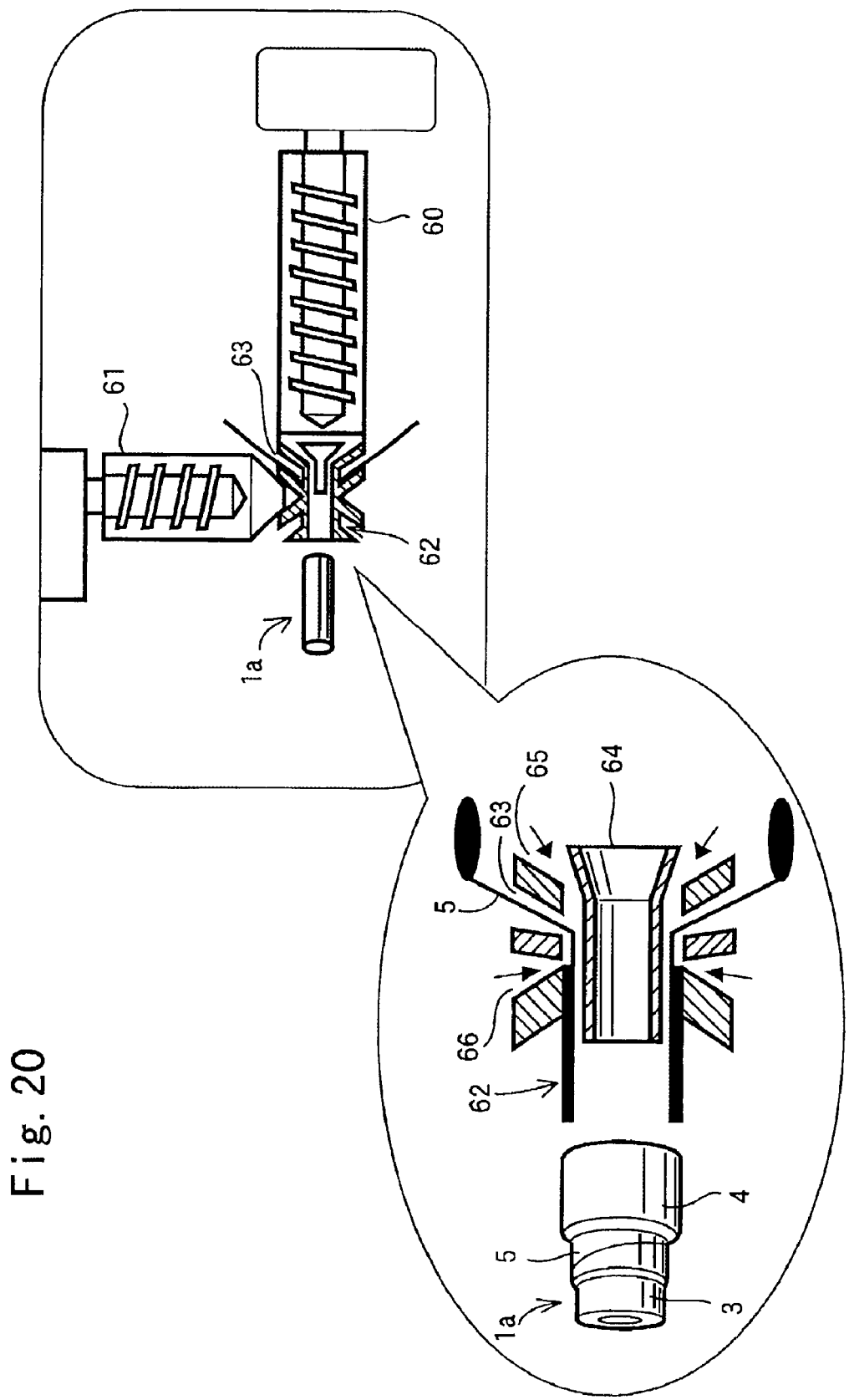
FIG. 20 is a view showing a cross head construction technique of a ninth embodiment.

A rubber hose according to the present invention can also be molded by a crosshead construction method. A ninth embodiment relating to the cross-head method will now be described. In FIG. 20, an inner layer extruder 60 and an outer layer extruder 61 are connected to a head 62 from the perpendicular direction. A supply section 63 of a resin film 5 is provided at the intermediate section of the head 62 which is connected to the inner layer extruder 60 and the outer layer extruder 61.

The head 62 is constructed as shown in an expanded view, in which the inner layer extruder 60 extrudes an inner layer rubber 3 from an inner layer rubber passage 65 to the periphery of an inner core 64. The resin film 5 of a tape shape which is supplied from the film supply section 63 is helically wound around the inner layer rubber 3 (see FIG. 21). The outer layer extruder 61 extrudes an outer layer rubber 4 from an outer layer rubber passage 66 on the inner layer rubber 3 for lamination. In this manner, a desirable hose 1a is obtained.

Figure 21:
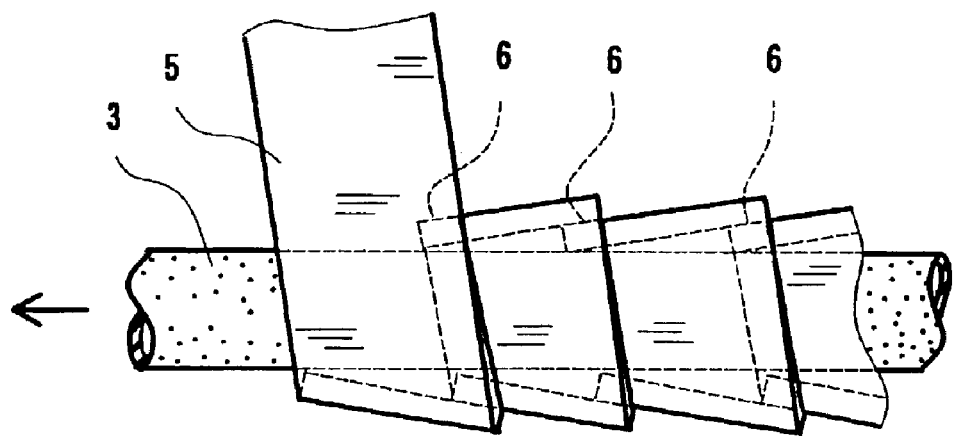
FIG. 21 is a view showing the helical winding of a film according to the above-mentioned construction technique.
Figure 22:
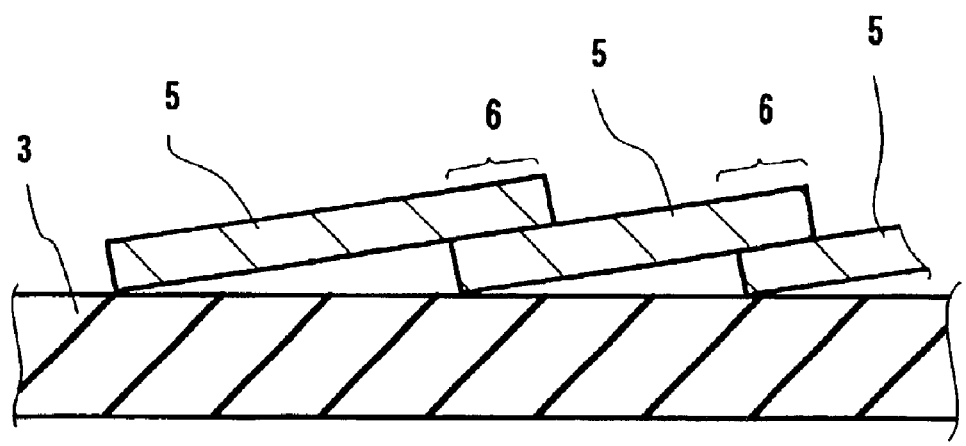
FIG. 22 is a partially enlarged cross-sectional view of the helical winding.

Thus, the film 5 can be helically wound around the rubber using the cross-head construction method. As shown in FIG. 22, the resin film 5 forms an overlapping section 6 around the inner layer rubber 3 in the longitudinal direction. By vacuum-sucking the overlapping section 6 through the film supply section 63, adsorption is performed and close contact can be maintained. FIG. 21 shows the condition in which the resin film 5 is wound around the inner layer rubber 3 and FIG. 22 is a partially expanded cross-sectional view showing the winding operation Next, a tenth embodiment relating to the bending treatment outside the extrusion head will be described.

Figure 23:
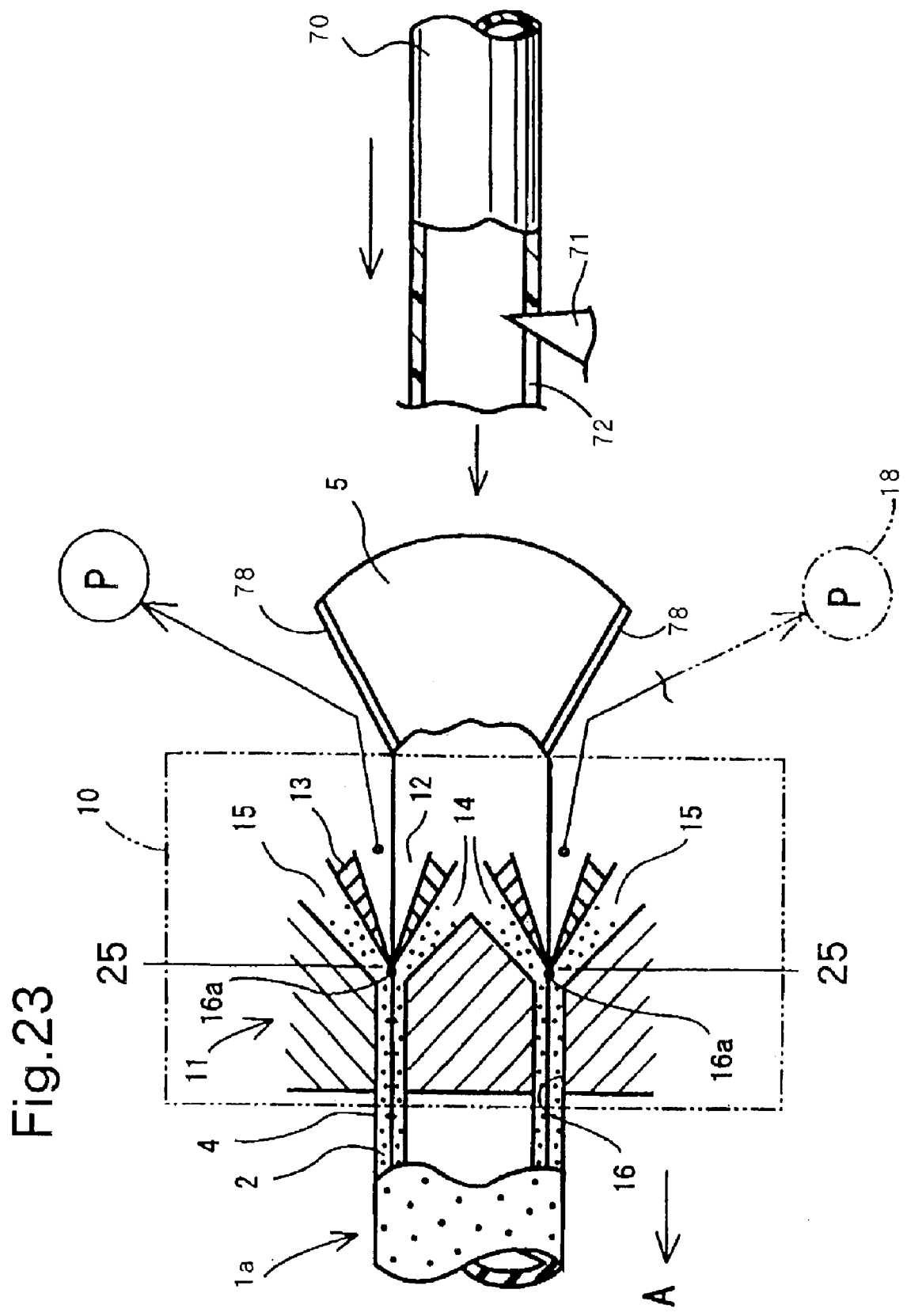
FIG. 23 is a view schematically showing a molding device of a tenth embodiment.
Figure 24:
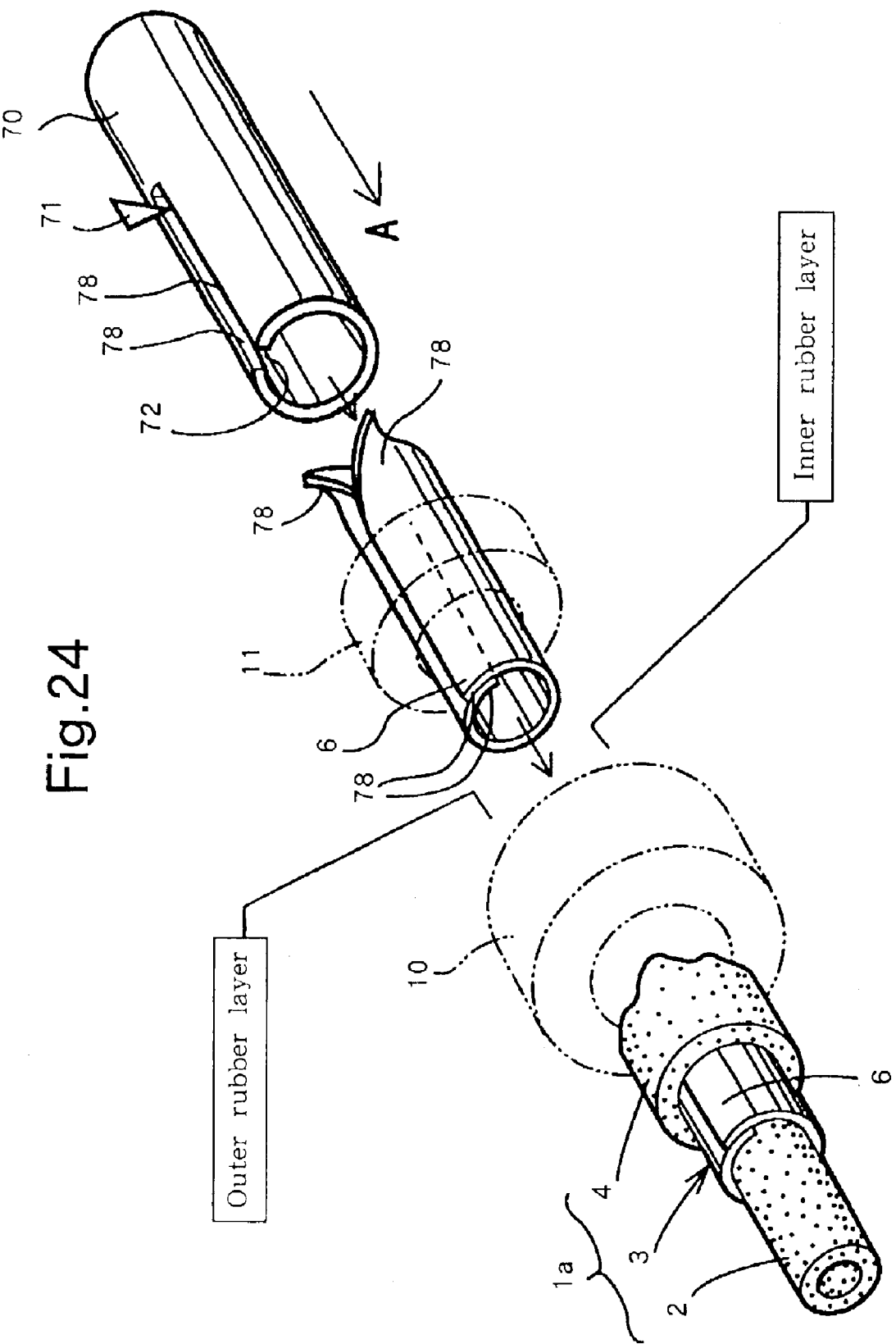
FIG. 24 is a perspective view schematically showing an extrusion molding method according to the tenth embodiment.

As shown in FIGS. 23 and 24, the intermediate layer 2 is formed as a pipe 70 which has been obtained in advance by extrusion-molding a high elastic material as outlined below by separate equipment. The pipe 70 is cut by a cutter 71 in the axial direction to provide a slit-shaped cut line 72 to be opened laterally. Opposing ends 78, 78 of the cut line 72 are opened to provide a C-shaped cross-section. The pipe 70 is continuously fed into an extruder 10 in such a condition, wherein the pipe 70 is rounded again into a cylindrical shape to allow the opposing ends 78, 78 to overlap to form an overlapping section 6. The pipe 70 is then fed into an intermediate passage 12 of an extrusion head 11 while forming the overlapping section 9. The pipe 70 and the intermediate layer 2 are the same, but a section before extrusion molding is especially referred to as the pipe 70. The extruder 10 shown in FIG. 23 has a same structure a,s one in the above-mentioned embodiment.

Figure 25:
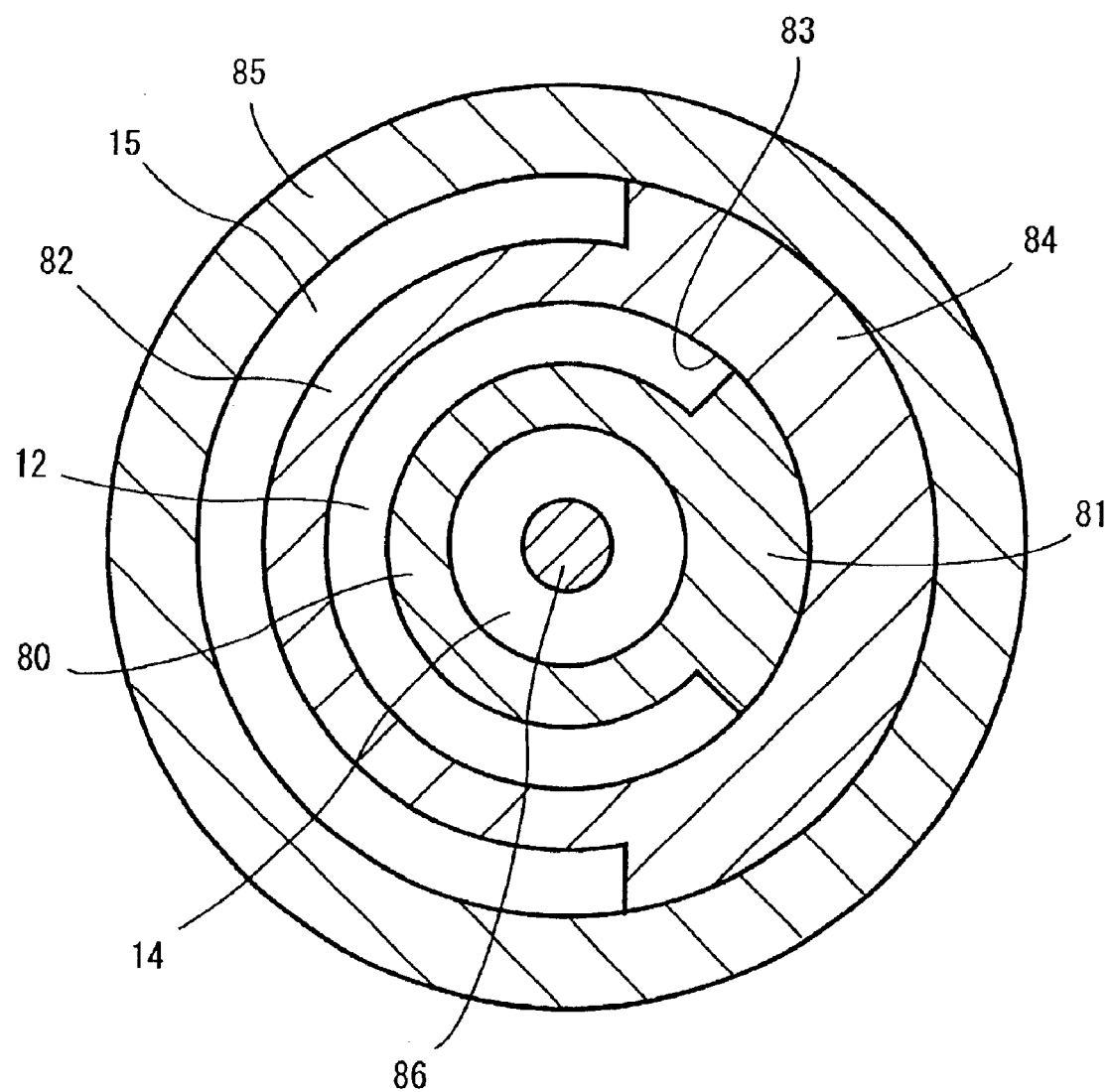
FIG. 25 is a cross-sectional view corresponding to the line 25—25 of FIG. 23.

FIG. 25 is a cross-sectional view corresponding to the line 25—25 of FIG. 23. The inner cylindrical section 80 is integrally provided, at part of the outer peripheral section, with a larger diameter section 81 which projects outward in the radial direction. The outer peripheral surface of the larger diameter section 81 closely contacts the inner peripheral slope 83 of the outer cylindrical section 82 and can be concentrically supported on the inner side of the outer cylindrical section 82, wherein the intermediate passage 12 has a C-shaped cross-section. Part of the outer peripheral section of the outer cylindrical section 82 is also integrally provided with a larger diameter section 84 which projects outward in the radial direction. The outer peripheral surface of the larger diameter section 84 closely contacts an inner peripheral slope of an outer ring 85, wherein an outer passage 15 has a semi-circular arch shape. Reference numeral 86 in FIG. 25 is a back joint which forms part of the inner passage 14 and concentrically holds the outer cylindrical section 82 and the inner cylindrical section 80. The back joint 86 also supports the core 20 (see FIG. 12) through an axial center road 86.

A production method for a hose made of various materials as outlined above will now be described in detail. FIG. 24 is a view for schematically explaining simultaneous extrusion molding according to the present invention in which an intermediate layer forming section 11 of an extrusion head 10 is separately shown for the sake of convenience. In this figure, a pipe 70 previously extrusion molded to have a circular cross-section is continuously fed into the intermediate layer forming section 11 along a feeding direction A while being cut by a cutter 71 to provide a cut line 7.

In this case, in front of the intermediate layer forming section 11, the opposing cut sides 78, 78 of the pipe 70 are opened to provide a substantially C-shaped cross-section as in the intermediate passage 12 of a C-shaped cross-section shown in FIG. 25. Thus, the pipe 70 can be inserted into the intermediate passage 12 even though the inner cylindrical section 80 has the larger diameter section 81. After passing through this larger diameter section 81, the pipe 70 is rounded again into a circular cross-section within the intermediate layer forming section 11 to allow the opposing ends 78, 78 to overlap to provide the overlapping section 6. Since the pipe 70 tends to maintain the circular cross-section from its inherent structure, it readily forms the overlapping section 6 and makes it difficult to open.

In this manner, after the pipe 70 is first cut open, the pipe 70 is rounded again into a substantially circular cross-section within the intermediate layer forming section 11. Then, the inner rubber layer 3 and the outer rubber layer 4 are extruded inside and outside the pipe 70 and a hollow rubber hose 1 obtained by integrally molding these three layers is simultaneously extrusion-molded and then extruded from the extrusion head 10.

Since the intermediate layer is formed as the pipe 70 which tends to be restored to its original shape within the intermediate passage 12, it is possible to readily form the overlapping section 6. A small space 29 is formed between a section of the pipe 70 other than the overlapping section 6 and a section of the intermediate passage 12 on the exit side (see FIG. 11). Accordingly, the pressure up to the junction 16a shown in FIG. 23 can be reduced in a single operation by a vacuum pump 18 connected through the space 29 to intermediate passage 12.

The pipe 70 serving as the intermediate layer is fed into the junction 16a in a condition in which a section of the upper and lower opposing sides 78, 78 at the overlapping section 6 is decompressed and caused to adhere, wherein the inner rubber layer 3 and the outer rubber layer 4 are integrally molded. Accordingly, even with a pipe 70 of such a hardness that the overlapping section 6 is not caused to adhere, it is possible to positively allow the overlapping section 6 to adhere for simultaneous extrusion molding. In addition, highly efficient mass-production can be realized.

In this case, as is obvious from FIG. 23, a high vacuum condition is maintained up to the Junction 16a. Accordingly, it is possible to eliminate gas such as air, or foreign materials such as volatile matter, and to allow the inter rubber layer 3 and the outer rubber layer 4 to be integrally molded with the intermediate layer 2 with a high degree of adhesion. It is also possible to prevent generation of a phenomenon whereby the volatile matter expands to form bubbles during heating in the subsequent vulcanizing process. Further, since the high vacuum is maintained up to the junction 16a, the outer rubber layer 4 and the inner rubber layer 3 also receive the force in the direction in which they come close and it is possible to integrally mold them together with high adhesion strength.

As is described above, by molding the intermediate layer 2 into the pipe 70 in advance, even the highly elastic material can be rounded and fed into the extrusion head 10. As shown in FIG. 25, even though the intermediate passage 12 of the extrusion head 10 is constructed to have a C-shaped cross-section, the pipe 70 can be fed into the extrusion head by cutting the pipe 70 open in the C-shaped cross-section.

In this manner, it is possible to use the film with a high bending modulus. Namely, in the embodiment 2 in Table 1, an embodiment is shown in which such a bending treatment outside the extrusion head is adopted, wherein pressure has been reduced to 98658 Pa (740 mmHg) below atmospheric pressure. As is obvious from this Table, processing up to 20000 N of the film bending load is possible and the film of high bending modulus can be used. When pressure is largely reduced as shown in the embodiment, it is possible to eliminate gas such as air or foreign materials as volatile matter and it is difficult for the volatile matter to expand to form bubbles during vulcanizing or the like.

Moreover, in the case of bending treatment within the extrusion head, even though the extrusion head 11 is decompressed, the limit of the adhesion effect of the film is between 5000 N and 10000 N at the most. However, if bending treatment outside the extrusion head is performed and pressure is reduced, this means that it is possible to process up to 20000 N. If the film is shaped into the cylindrical shape in advance, processing is easier than with the bending treatment within the extrusion head. Since the film of a high bending modulus after extrusion acts to maintain the cylindrical shape, this also helps improve workability.

When such a high bending modulus film is used, it is desirable that flexing be improved during mounting of the rubber on the mandrel and in the hose product. For such a purpose, when the film is shaped into the cylindrical shape, by providing irregularities extending in the circumferential direction, it is effective to make the entire section or part thereof a bellows-shape.

After forming the film in the cylindrical shape in advance, the film can be processed also by blow molding or the like to form a circular irregularity on the circumference in the circumferential direction. If the irregularity is continuously provided in the longitudinal direction to provide a bellow shape, it is also possible to freely bend the film in the longitudinal direction.

FIG. 26 shows a eleventh embodiment relating to an overlapping section formed by the bending treatment outside the extrusion head. According to one example shown in FIG. 26(A), the opposed sections 78, 78 do not overlap directly and both ends thereof are arranged to face one another with a gap 79 between. A separate seal piece 77 is positioned to bridge the gap 79 and is integrally welded to both the long side sections. In this manner, it is possible to provide an intermediate layer with a larger diameter than the pipe 70 whereby the opposed sections 78, 78 cannot be overlapped. The degrees of freedom in the diameter dimension become large. Even when the opposed sections 78, 78 are overlapped in advance, or when the section does not sufficiently overlap and the gap 79 is partly generated, it is prevented for gas or liquid to penetrate from the gap 79, since the gap 79 is sealed by a seal piece 77.

According to another example shown in FIG. 26(B), the opposed sections 78, 78 are caused to directly overlap to provide an overlapping section 6. A separate seal piece 77 is positioned over the overlapping section 6 and the seal piece 51 and the section 6 are integrally welded together. In this manner, even when the slit or the like is formed on the lapping portion 6, it is possible to keep impermeability and to further strengthen the joint of the opposed sections 78, 78 at the overlapping section 6. Forming of the overlapping section using the seal piece 77 is also available for the bending treatment within the extrusion head. In the case, the opposed sections 78, 78 are made as the long side sections 8, 8.

Preferred embodiments of the present invention relating to a step-less structure will now be described with reference to the accompanying drawings. FIG. 27 through FIG. 30 are drawings relating to the twelfth embodiment.

Figure 27:
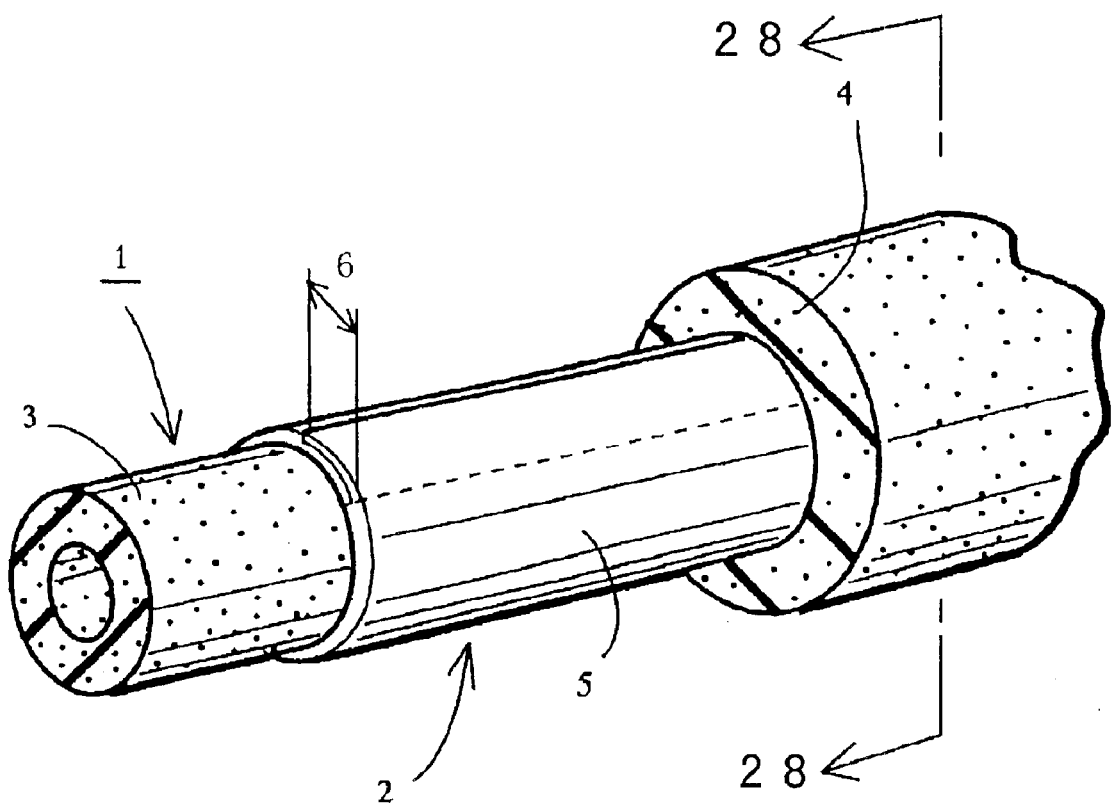
FIG. 27 is a perspective view of a completed thin hose partially cut away according to a twelfth embodiment (FIGS. 27 through 30)
Figure 28:
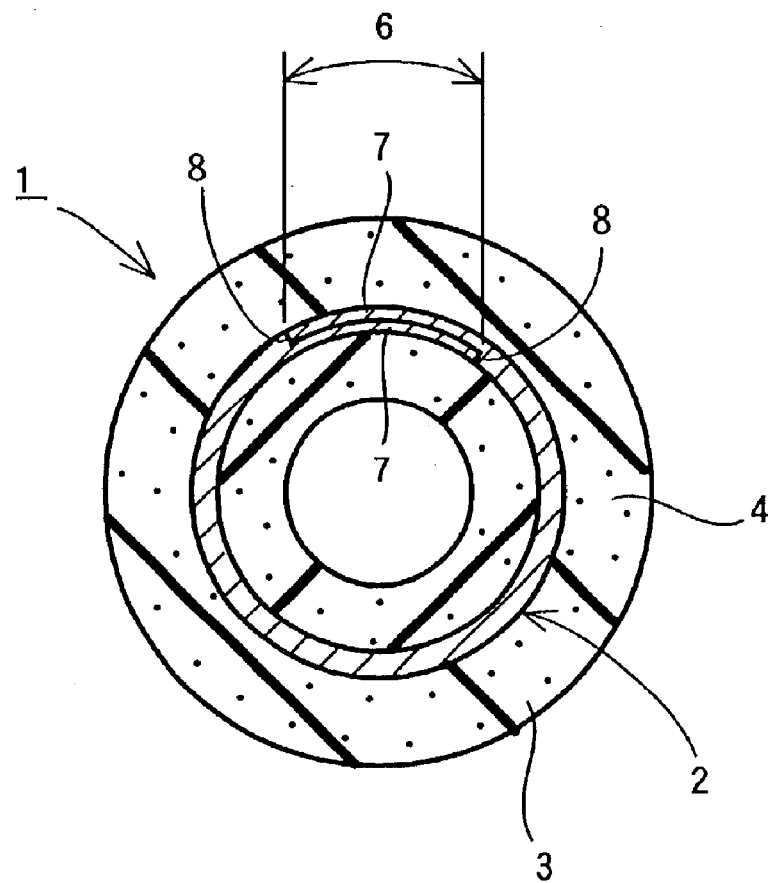
FIG. 28 is a cross-sectional view taken along the line 28—28 of FIG. 27.

As shown in FIGS. 27 and 28, the rubber hose 1 is provided with an intermediate layer 2, an inner rubber layer 3 and an outer rubber layer 5. The total thickness of the rubber hose including the intermediate layer 2, the inner rubber layer 3 and the outer rubber layer 4 is about 1.5~3.5 mm. This is an extremely thin hose compared with a conventional one.

Either the bending treatment within the extrusion head or the bending treatment outside the extrusion head can form the intermediate layer 2. The bending treatment within the extrusion head will now be described. The resin film 5 forming the intermediate layer 2 is rounded into a cylindrical form to provide a partially overlapping section 6. The overlapping section 6 is provided with a thinned section 90 in the longitudinal direction.

This simultaneous extrusion molding can be done by the above-described method. The cross head structure is also available. A following explanation relates to the simultaneous extrusion molding.

Figure 30:
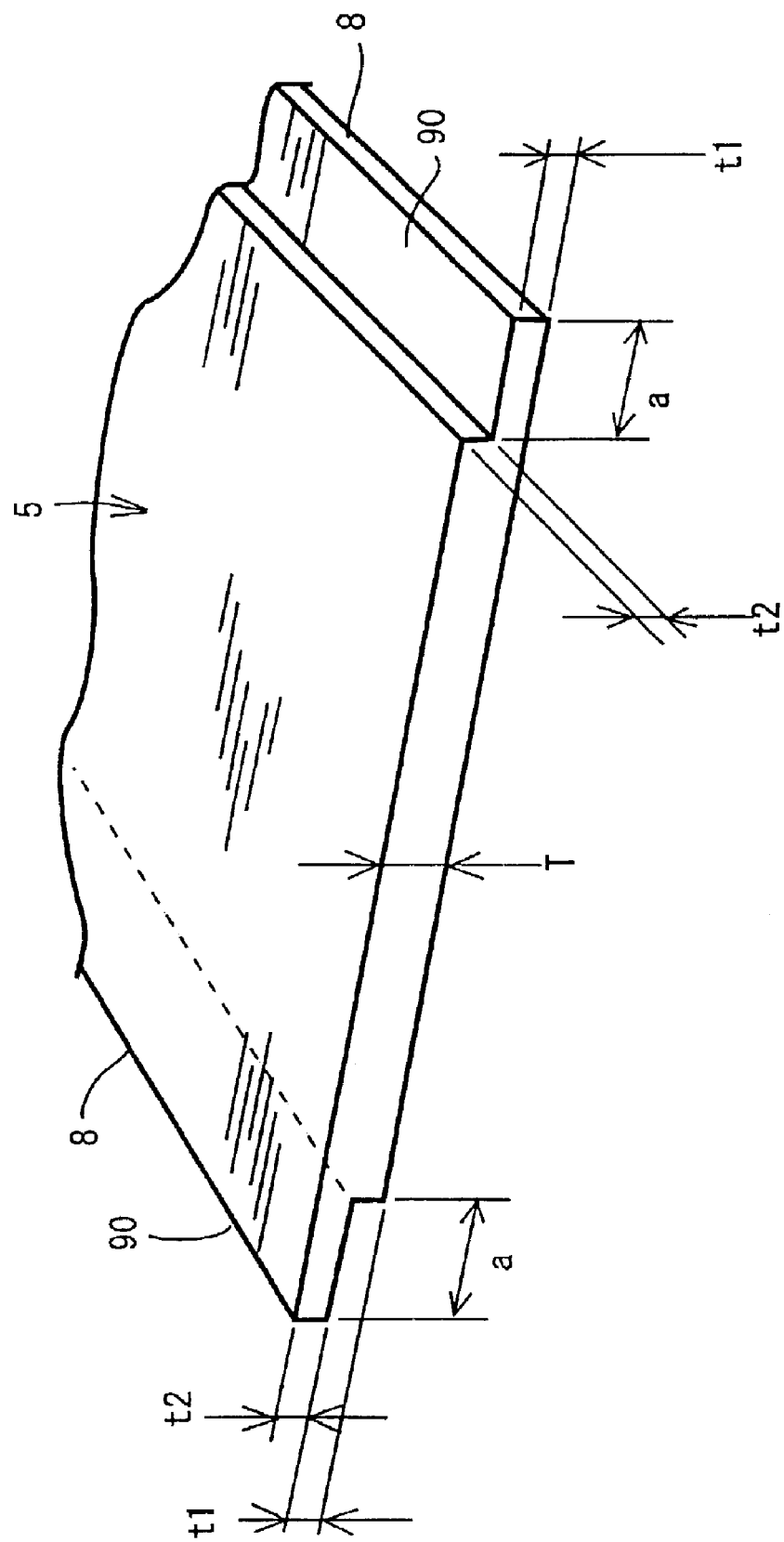
FIG. 30 is a perspective view showing the planar shape of the resin film.

FIG. 29 is a cross-sectional view of the intermediate layer 2 formed in cylindrical shape and FIG. 30 is a partially extended perspective view of the resin film 5 in a condition of a planar shape. As is obvious from these figures, the long side sections 8, 8 are respectively provided with a thinned section 90 consisting of thin steps that are inversely provided. This thinned section 90 is formed to stretch over the full length of the resin film 5 in the width of the overlapping measurement (a) and continuously formed at the same time as molding of the resin film 5. Slits 7 are provided along the long side section 8 in a range, entering inwardly, forming a width of an overlapping dimension (a) from each edge section of both long side sections 8, 8 on the right and left side. This overlapping dimension (a) has a width equivalent to or smaller than that of the overlapping section 6. The structure of the long side sections 8, 8 forming the thinned section 90 is one specific example of a weak section structure.

The right and left thinned sections 90 are set to overlap at the overlapping section 6. When a length obtained by adding one third (⅓) of the circumferential length of the intermediate layer 2 to the circumferential length is set as the maximum width (i.e. short side measurement) of the resin film 5 (for example, when the inner diameter of a rubber hose is 36.5 mm and the thickness thereof is 3 mm, the added measurement is 41 mm), it is desirable that the thinned sections 7 of a maximum length of 40 mm be provided over an equal width in the longitudinal direction of the resin film 5 on both sides or one side of the long side sections 8, 8 of the resin film 5.

In FIG. 30, when the thickness of the resin film 5 in a central section (a section between the long side sections 8, 8) in the lateral direction is T, one of the thinned sections 7 has a thickness t1. The thickness of the other thinned section 7 is t2 where t2=T−t1. In this manner, both the thinned sections 90, 90 overlap at an overlapping section 6 so that the total thickness becomes the thickness T of the resin film 5 at the central section. Accordingly, the entire thickness is constant and no step is formed on the circumferential section of the intermediate layer 2.

Operation of the present embodiment will now be explained. In FIG. 30, since the long side sections 8, 8 are provided with thinned sections 90, these sections 8, 8 form weak sections. Accordingly, when the resin film 5 is bending-treated within the extrusion head, it is easily bent and a uniform cylindrical shape can be provided. As a result, since a uniform cylindrical shape can be maintained even during the simultaneous extrusion molding in an extrusion head 10, it is possible to form a thin hose.

Accordingly, as no bar-shaped step resulting from the overlapping section 6 is provided on the inner surface or outer surface of the thin rubber hose 1 after extrusion molding, the fastening force becomes constant when the rubber hose 1 is mounted on the other member and secured by a spring clip, and the sealing properties are improved. Thus, it is possible to make it difficult for the rubber hose 1 to separate from the other member. If the bar-shaped step is formed on the surface (i.e. outer surface) of the rubber hose 1, the fastening force of the spring clip becomes inconstant and thus an improved method of mounting is required to improve the sealing properties and non-separation properties. Accordingly, the thin hose is realized without spoiling mounting performance.

Even in the case of woven fabric reinforced cloth which is superior to the resin film in flexibility and extensibility and of which the cloth end section in the overlapping section is originally difficult to break during extrusion molding, there is some possibility that the cloth end section will break if the overlapping width is too great. In the case of the resin film that is inferior to the woven fabric reinforced cloth in flexibility and extensibility, it is considered that a break will be easily generated in the course of bending into a cylindrical shape from a planar shape. However, by providing a thinned section 90, 90 on the long side sections 8, 8, the resin film can be easily bent and such a break is easily prevented. If the thinned sections 90, 90 are provided with slits or the like, it is possible to make them weaker.

In a condition of the raw rubber hose obtained by such simultaneous extrusion molding, at the overlapping section 6 of the resin film 5 forming the intermediate layer 2, the long side sections 8, 8 which overlap are not integrally secured by welding or the like. Accordingly, some displacement is possible between the overlapped sections.

However, since the intermediate layer 2 is integrally embedded between an inner rubber layer 3 and an outer rubber layer 4, it is possible to maintain the overlapping section 6 even though there is deformation due to a certain amount of displacement or the like. The overlapping measurement (a) (see FIG. 5) is also set to such a degree that the overlapping section 6 can be maintained.

When the raw rubber hose 12 is vulcanized, it can be mounted on the mandrel conforming to the bent shape of the latter since the overlapping section 6 is designed to have a flexible structure for permitting deformation such as displacement.

Next, when the raw rubber hose 12 mounted on the mandrel is vulcanized at a predetermined temperature, the inner rubber layer 3 and the outer rubber layer 4 are vulcanized and set in a bent shape. Since the resin film 5 of the intermediate layer 2 is also melted at the vulcanizing temperature and then hardened, the upper and lower long side sections 8, 8 are integrally welded at the overlapping section 6. In this case, since the thinned sections 90 have disappeared to form a single resin layer, impermeability improves further.

Further, if the resin film 5 is formed to have a multilayered structure of two to five layers and the melting point of the resin film of at least an innermost layer or an outermost layer is lower than the vulcanizing temperature of the raw rubber hose, it is possible to weld the overlapping section 6 and the thinned sections 90 of the resin film 5 in the vulcanizing process. When a resin of which the permeability resistance is superior but the melting point is low is used, a resin with a low melting point can also be used by laminating a resin, of which the heat resistance is superior, to both sides of the resin with a low melting point.

Figure 32:
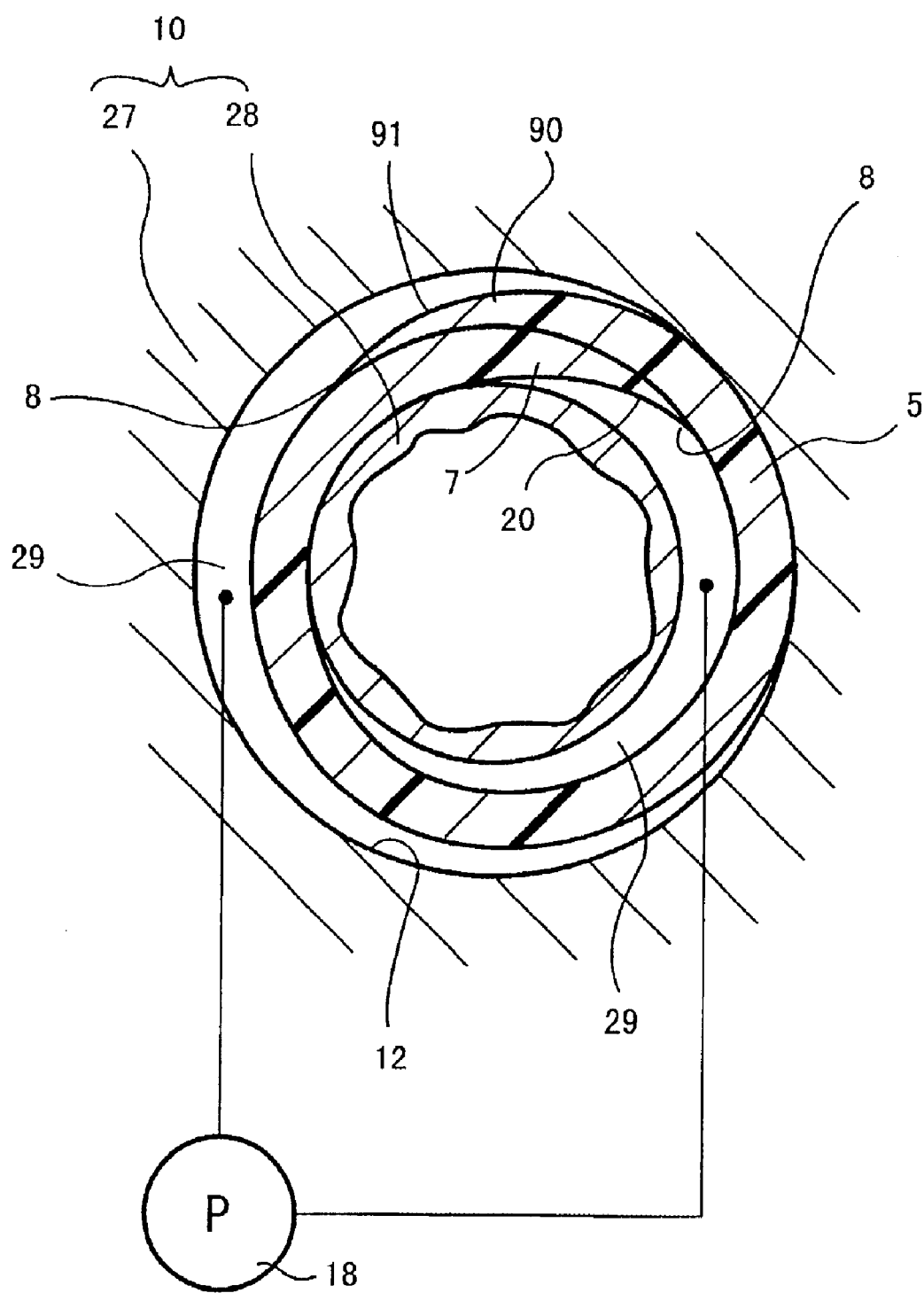
FIG. 32 is a partial cross-sectional view of an extrusion head according to the thirteenth embodiment.

FIGS. 31 and 32 relate to a thirteen embodiment, wherein FIG. 31 is an explanatory view in the case where a resin film 5 is bent into a cylindrical shape and FIG. 32 is partial cross-sectional view of an extrusion head 10. A structure of the extrusion head 10 shown in FIG. 32 is as same as one shown in FIG. 11. In FIG. 31, the upper section of the figure shows the resin film in an extended shape where the long side sections 8, 8, are provided with inversely faced tapered surfaces 91, 91, thereby forming the thinned sections 90, 90. The tapered surfaces 91, 91 are formed in an inclined shape so that the thinned sections 90, 90 are gradually thinned toward one end in the lateral direction of the long side sections 8, 8.

As shown in the lower section of the figure, when the resin film 5 is rounded in the lateral direction to allow the long side sections 8, 8 to overlap, the taper surfaces 91, 91 overlap to provide an overlapping section 6. When the thickness of the resin film 5 in a central section (a section between the long side sections 8, 8) in the lateral direction is T, the thickness of the overlapping section 6 is almost equivalent to T. As a result, it is possible to dispense with any step on the overlapping section 6.

The taper surfaces 91, 91 can be provided on the surface of the long side sections 8, 8 opposing one another or on the surface on the same side. The taper surfaces 91, 91 can also be provided to form a wedge in the cross-section from both surfaces. Further, the tapered sections 91, 91 can be formed to stretch the full length of the resin film 5 in the longitudinal direction in the width of the overlapping measurement (a) and can be continuously formed at the same time as molding of the resin film 5 or formed in the subsequent process.

It is desirable that the length of the taper surfaces 91, 91 in each lateral direction be longer by a predetermined measurement (e.g. about 10 mm) than the length (a) of the overlapping section 6. In this manner, even though the length of the overlapping section 6 has changed minutely at the time of actual extrusion molding, it is possible to sufficiently secure the thickness as the intermediate layer 2 to maintain a necessary level of permeability resistance. Even though the overlapping section 6 has been displaced a little in the lateral direction, it is possible to substantially make the entire thickness of the overlapping section 6 constant so that a bar-shaped step resulting from the overlapping section 6 is not produced on the inner surface or outer surface of the thin rubber hose 1.

In particular, in the intermediate layer 2 with a thickness of 0.05 mm or more, when a step corresponding to the thickness of the film is produced at the overlapping section 6, even though the overlapping section 6 is covered by the inner and outer rubber layers, the step tends to remain on the inner surface of the inner layer or the outer surface of the outer layer. The greater the thickness of the film and the greater the elasticity, the more prominent the step, and the thinner the inner and outer rubber layers, the more prominent the step. However, by making the long side sections 8, 8 thinner and tapered, it is possible to substantially remove such a step. It is also possible to provide slits on the thinned section to make it weaker for easy bending.

To form the resin film 5 in a cylindrical shape, as shown in FIG. 32, an intermediate layer passage 12 is provided between an outer die 27 and an inner die 28 within an extrusion head 10. The resin film 5 is rounded and inserted into the intermediate layer passage 12. The intermediate layer passage 12 is a ring-shaped space and the opening width is almost the same as the thickness of the overlapping section 6.

The upper and lower long side sections 8, 8 forming the overlapping section 6 partially contact the inside of the intermediate layer passage 12. However, space 29 is formed between a part of the overlapping section 6 and parts other than the overlapping section 6 and the intermediate layer passage 12. When operation of a vacuum pump 26 connected through the space 29 to the intermediate layer passage 12 reduces the pressure of the intermediate layer passage 12, the pressure of the space between the upper and lower long side sections 8, 8 is also reduced at the overlapping section 6. As a result, the upper and lower long side sections 8, 8 are caused to closely contact each other.

In this condition, an inner rubber layer 3 and an outer rubber layer 4 are extruded inside and outside the resin film 5 for integration. Accordingly, even though the resin film 5 is too hard to allow close contact with the overlapping section 6, it is possible to allow reliable contact with the overlapping section and to perform simultaneous extrusion molding. It is also possible to efficiently mass-produce a rubber hose. In addition, since foreign materials such as volatile matter in the overlapping section 6 are extracted and removed, it is possible to prevent a phenomenon whereby the volatile matter expands to form bubbles during heating in the subsequent vulcanizing process.

A stepless structure is provided, in which the long side sections 8, 8 are thinned in the tapered shape as shown in the present embodiment or the long side sections 8, 8 are thinned in the step shape as shown in FIG. 30, so that the thickness of the overlapping section 6 is the same as or equivalent to that of the non-overlapping sections, thereby providing the overlapping section 6 without any step or with a small step. This stepless structure can not only be applied to the molding method according to the previous embodiment in which the long belt-shaped film 5 is rounded to be inserted into the extrusion head, thereby forming the cylindrical shape, but also to a production method in which the film is rounded into the cylindrical shape in advance in front of the extrusion head or the film is extrusion-molded first as a pipe member, and then slits are formed on the pipe member in the longitudinal direction for opening the pipe member (referred to as "preforming treatment").

Figure 33:
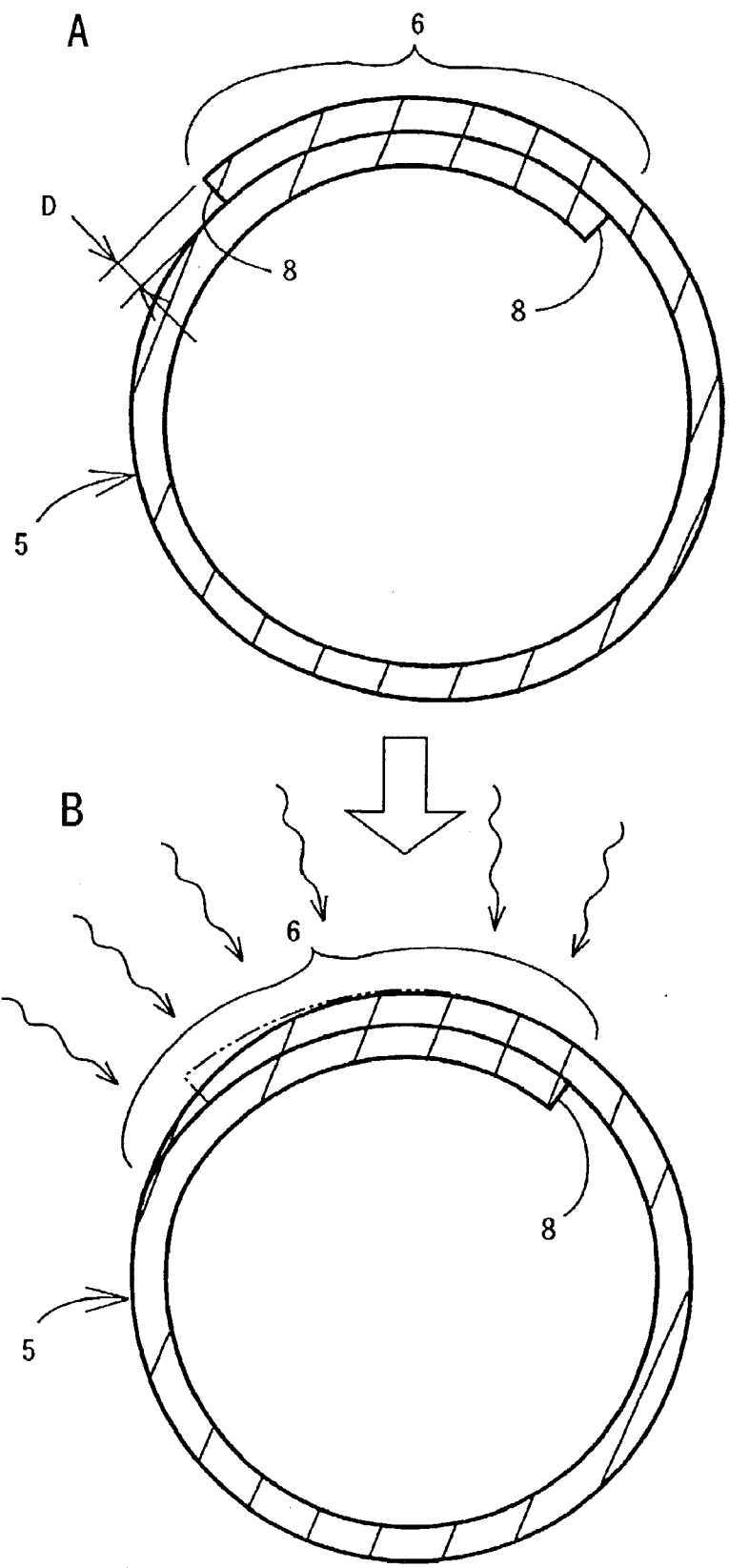
FIG. 33 is a view showing a fourteenth embodiment for eliminating a step in a overlapping section.

FIG. 33 is a fourteenth embodiment further showing another example for eliminating the step in the overlapping section 6. In this example, the overlapping section 6 of a general structure provided with a step D is formed in a cylindrical shape (see FIG. 23A). The step D is then melted by means of ultrasonic welding or the like to eliminate at least the step formed on the outer surface side (see FIG. 23B). In this manner, since the same degree of accuracy in overlapping is not required as in the case where a side of the resin film 5 is thinned in advance before overlapping, production becomes easier.

When a rubber hose according to the present invention is molded either by a cross head structure method, by a helically winding or by a overlapping section, which is parallel to the axis line, forming method, the overlapping portion can be made to be the step-less structure. In a case in which the bending treatment outside the extrusion head is adopted, the thinned portion can be formed during the resin pipe is supplied to the extrusion head while pressure is reduced after the pipe is formed in advance in a cylindrical shape and cut out along the longitudinal direction. It is possible to form a cut out portion in a thinned portion simultaneously with the extrusion of the pipe and the thin portion is formed simultaneously with cutting out.

Industrial Applicability

Production method of a thin rubber hose according to the present invention is suitable for thinning a impermeability rubber hose for the purpose of light-weighting and cost reduction and for extrusion molding of gas or liquid transportation hose using a resin or metal film as an intermediate layer for improving permeability performance.

What is claimed is:

1. A thin rubber hose having a resin film as an intermediate layer with an inner rubber layer and an outer rubber layer laminated inside and outside the resin film, characterized in that the resin film consists of a long belt-shaped film having a weak section provided in advance only on the long sides of the film, wherein the resin film is rolled up into a cylindrical shape so that the two long sides overlap and said intermediate layer maintains impermeability.

2. The thin rubber hose according to claim 1, where the resin film is laminated with a metal film or a reinforced fiber layer.

3. A thin rubber hose comprising an inner rubber layer and an outer rubber layer laminated respectively inside and outside a resin film serving as an intermediate layer, characterized in that the intermediate layer has a circular cross section and forms an overlapping section by allowing a pair of side sections, which divide the intermediate layer in the circumferential direction, to overlap, wherein at least one of the two ides forming the overlapping section on the surface side is thinned to eliminate a step in the overlapping section on the surface side.

4. The thin rubber hose according to claim 3, wherein the thinned section is tapered to gradually reduce the thickness of the side toward one end in the circumferential direction.

5. The thin rubber hose according to claim 1, wherein the resin film is a thermoplastic resin and the overlapping section has not been welded at first and is integrally welded simultaneously with the vulcanization of the inner rubber and the outer rubber layer.

6. The thin rubber hose according to claim 1, wherein the weak section is composed of a plurality of slits cut inwardly from the edge sections of the long sides, and the inward end of each slit is inclined toward the feeding direction of the resin film or is provided perpendicular to the longitudinal direction of the resin film.

7. The thin rubber hose according to claim 1, wherein the sits are provided on both long sides and provided in a positional relation in which they do not overlap when the two long sides overlap.

8. The thin rubber hose according to claim 1, wherein the sits are provided on the two long sides in a positional relation in which they overlap when the two long sides overlap.

9. The thin rubber hose according to claim 1, wherein the weak section is composed of a plurality of punched holes.

10. The thin rubber hose according to claim 1, wherein the weak section is formed by thinning one or both of the long side sections which overlap.

11. The thin rubber hose according to claim 1, wherein thinning is realized by a taper shape in which the thickness is gradually reduced toward an end section.

12. The thin rubber hose according to claim 1, wherein the resin film includes a thermoplastic resin or an inorganic material such as metal, or a laminated structure combining them.

13. The thin rubber hose according to claim 1, wherein the film bending load is 400 N or more when the film width is 100 mm and the film thickness is 0.05 nm.

14. The thin rubber hose according to claim 1, wherein each of the two long sides which overlap is tapered so that they are thinned toward the end in the lateral direction thereof.

15. The thin rubber hose according to claim 1, wherein the intermediate layer is formed in bellows-shape.

* * * * *